(12) United States Patent
Gubbi Lakshminarasimha et al.

(10) Patent No.: US 12,100,124 B2
(45) Date of Patent: Sep. 24, 2024

(54) METHODS AND SYSTEMS FOR GENERATING END-TO-END DE-SMOKING MODEL

(71) Applicant: Tata Consultancy Services Limited, Mumbai (IN)

(72) Inventors: Jayavardhana Rama Gubbi Lakshminarasimha, Bangalore (IN); Vartika Sengar, Bangalore (IN); Vivek Bangalore Sampathkumar, Bangalore (IN); Aparna Kanakatte Gurumurthy, Bangalore (IN); Murali Poduval, Mumbai (IN); Balamuralidhar Purushothaman, Bangalore (IN); Karthik Seemakurthy, Bangalore (IN); Avik Ghose, Kolkata (IN); Srinivasan Jayaraman, Lake Oswego, OR (US)

(73) Assignee: Tata Consultancy Services Limited, Mumbai (IN)

( * ) Notice: Subject to any disclaimer, the term of this patent is extended or adjusted under 35 U.S.C. 154(b) by 462 days.

(21) Appl. No.: 17/552,868

(22) Filed: Dec. 16, 2021

(65) Prior Publication Data

US 2023/0047937 A1    Feb. 16, 2023

(30) Foreign Application Priority Data

Jul. 29, 2021    (IN) .............................. 202121034136

(51) Int. Cl.
*G06T 5/70* (2024.01)
*G06T 5/50* (2006.01)
*G06T 7/269* (2017.01)

(52) U.S. Cl.
CPC .................. *G06T 5/70* (2024.01); *G06T 5/50* (2013.01); *G06T 7/269* (2017.01);
(Continued)

(58) Field of Classification Search
CPC .. G06T 5/70; G06T 7/269; G06T 5/50; G06T 2207/10016; G06T 2207/10024; G06T 2207/20081; G06T 2207/20084
See application file for complete search history.

(56) References Cited

U.S. PATENT DOCUMENTS

2023/0377097 A1* 11/2023 Li .............................. G06T 7/11

OTHER PUBLICATIONS

Ma et al "A Smoke Removal method based on combined data an modified U-Net for endoscopic images" 43rd Annual International Conference of the IEEE Engineering in Medicine & Biology Society (EMBC) Oct. 31-Nov. 4, 2021. Virtual Conference (Year: 2021).*

(Continued)

*Primary Examiner* — Sean T Motsinger
(74) *Attorney, Agent, or Firm* — Finnegan, Henderson, Farabow, Garrett & Dunner, LLP

(57) ABSTRACT

The disclosure herein relates to methods and systems for generating an end-to-end de-smoking model for removing smoke present in a video. Conventional data-driven based de-smoking approaches are limited mainly due to lack of suitable training data. Further, the conventional data-driven based de-smoking approaches are not end-to-end for removing the smoke present in the video. The de-smoking model of the present disclosure is trained end-to-end with the use of synthesized smoky video frames that are obtained by source aware smoke synthesis approach. The end-to-end de-smoking model localize and remove the smoke present in the video, using dynamic properties of the smoke. Hence the end-to-end de-smoking model simultaneously identifies the regions affected with the smoke and performs the de-smoking with minimal artifacts. localized smoke removal and color restoration of a real-time video.

19 Claims, 14 Drawing Sheets

(52) U.S. Cl.
CPC .............. *G06T 2207/10016* (2013.01); *G06T 2207/10024* (2013.01); *G06T 2207/20081* (2013.01); *G06T 2207/20084* (2013.01)

(56) References Cited

OTHER PUBLICATIONS

Sidorov et al "Generative Smoke Removal" Proceedings of Machine Learning Research 116:81-92, 2020 (Year: 2020).*
Bolkar et al., "Deep Smoke Removal from Minimally Invasive Surgery Videos," (2018).
Chen et al., "De-smokeGCN: Generative Cooperative Networks for Joint Surgical Smoke Detection and Removal," (2020).
Wang et al., "Multiscale deep desmoking for laparoscopic surgery," (2019).
Xu et al., "Deep Domain Adaptation Based Video Smoke Detection using Synthetic Smoke Images," (2017).

* cited by examiner

Forming (i) one or more natural smoke-free video frames out of the plurality of natural smoke-free video frames present in the natural smoke-free video frames dataset, as a third mini batch, and (ii) one or more natural smoky video frames out of the plurality of natural smoky video frames present in the natural smoky video frames dataset, as a fourth mini batch, based on a predefined mini batch size 204a1

Generating a set of source aware smoke synthesis parameters, for each natural smoke-free video frame of the one or more natural smoke-free video frames present in the third mini batch, using a current state of the smoke parameter generation model 204a2

Generating a synthesized smoky video frame for each natural smoke-free video frame of the one or more natural smoke-free video frames present in the third mini batch, using a smoke synthesis model present in the smoky video frame generation model, based on the set of source aware smoke synthesis parameters corresponding to each natural smoke-free video frame, to obtain one or more synthesized smoky video frames for the one or more natural smoke-free video frames 204a3

Passing the one or more natural smoky video frames present in the fourth mini batch, to the smoke frame critic model, to obtain a natural smoky video frame confidence score for each natural smoky video frame of the one or more natural smoky video frames 204a4

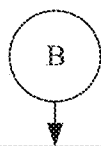

Passing the one or more synthesized smoky video frames, to the smoke frame critic model, to obtain a predicted smoky video frame confidence score for each synthesized smoky video frame of the one or more synthesized smoky video framess 204a5

Optimizing a smoke frame critic objective function comprising a natural score objective function and a synthetic score objective function, wherein the natural score objective function calculates an error between the natural smoky video frame confidence score for each natural smoky video frame and a predefined natural smoky video frame confidence score, and the synthetic score objective function calculates the error between the predicted smoky video frame confidence score for each synthesized smoky video frame and a predefined predicted smoky video frame confidence score 204a6

Updating weights of the smoke frame critic model, based on the smoke frame critic objective function 204a7

FIG. 4B

Forming one or more natural smoke-free video frames out of the plurality of natural smoke-free video frames present in the natural smoke-free video frames dataset, as a fifth mini batch, based on the predefined mini batch size 204b1

Generating the set of source aware smoke synthesis parameters, for each natural smoke-free video frame of the one or more natural smoke-free video frames present in the fifth mini batch, using the current state of the smoke parameter generation model 204b2

Generating the synthesized smoky video frame for each natural smoke-free video frame of the one or more natural smoke-free video frames present in the fifth mini batch, using the smoke synthesis model present in the smoky video frame generation model, based on the set of source aware smoke synthesis parameters corresponding to each natural smoke-free video frame, to obtain the one or more synthesized smoky video frames for the one or more natural smoke-free video frames 204b3

passing the one or more synthesized smoky video frames, to the smoke frame critic model, to obtain the predicted smoky video frame confidence score for each synthesized smoky video frame of the one or more predicted smoky video frames 204b4

FIG. 5A

Forming one or more smoky video clips out of the plurality of smoky video clips present in each smoky video of the plurality of smoky videos, as a first mini batch, based on a predefined mini batch size 206a1

Passing the one or more smoky video clips present in the first mini batch, to the encoder unit, to extract (i) frame-level spatial features and (ii) long-term spatio-temporal features, for each smoky video clip of the one or more smoky video clips 206a2

Passing (i) the frame-level spatial features and (ii) the long-term spatio-temporal features, for each smoky video clip of the one or more smoky video clips, to the de-smoking decoder unit and the smoke segmentation decoder unit, to obtain a predicted de-smoked video clip for each smoky video clip and a predicted smoke segmentation map for each smoky video clip, respectively 206a3

Passing the predicted de-smoked video clip for each smoky video clip, to the non-smoky frame critic model, to obtain a predicted de-smoking confidence score for each smoky video clip 206a4

FIG. 7A

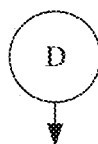

Optimizing a total objective function of the encoder-decoder model, wherein the total objective function comprises: (a) a de-smoking objective function which calculates an error between (i) the predicted de-smoked video clip corresponding to each smoky video clip and (ii) the smoke-free video clip corresponding to each smoky video clip; (b) a segmentation objective function which calculates the error between (i) the predicted smoke segmentation map corresponding to each smoky video clip and (ii) the binary smoke segmentation mask for each smoky video frame of the predefined number of smoky video frames corresponding to each smoky video clip; and (c) a non-smoky critic objective function which calculates the error between (i) the predicted de-smoking confidence score for each smoky video clip, and (ii) a predefined de-smoking confidence score 206a5

Updating weights of the encoder unit and the decoder unit, based on the total objective function 206a6

FIG. 7B

Forming the one or more smoky video clips out of the plurality of smoky video clips present in each smoky video of the plurality of smoky videos, as a second mini batch, based on the predefined mini batch size 206b1

Passing the one or more smoky video clips present in the second mini batch, to the encoder unit, to extract (i) the frame-level spatial features and (ii) the long-term spatio-temporal features, for each smoky video clip of the one or more smoky video clips 206b2

Passing (i) the frame-level spatial features and (ii) the long-term spatio-temporal features, for each smoky video clip of the one or more smoky video clips, to the de-smoking decoder unit and the smoke segmentation decoder unit, to obtain the predicted de-smoked video clip for each smoky video clip and the predicted smoke segmentation map for each smoky video clip, respectively 206b3

passing the predicted de-smoked video clip for each smoky video clip, to the non-smoky frame critic model, to obtain the predicted de-smoking confidence score for each smoky video clip 206b4

FIG. 8A

METHODS AND SYSTEMS FOR GENERATING END-TO-END DE-SMOKING MODEL

PRIORITY CLAIM

This U.S. patent application claims priority under 35 U.S.C. § 119 to: Indian Patent Application No. 202121034136, filed on 29 Jul. 2021. The entire contents of the aforementioned application are incorporated herein by reference.

TECHNICAL FIELD

The disclosure herein generally relates to the field of image and video processing, and, more particularly, to methods and systems for generating an end-to-end de-smoking model to remove smoke present in a video.

BACKGROUND

Removing a scattering media such as smoke (also referred as 'plume') present in videos is very important in many applications including time critical minimally invasive surgeries such as laparoscopic surgeries, arthroscopic surgeries, and robotic surgeries, deep sea autonomous vehicle navigation, automated welding, firefighting devices, and so on. For example, during the time critical minimally invasive surgeries, a camera with a light source is inserted into an internal organ via a small incision to capture a video feed. The video feed captured from the camera is an only source for visualization of the internal organ. Use of energy instruments such as diathermy and harmonic scalpels for cauterization of vessels and dissection of tissue while performing the surgery, produces the smoke which may degrade quality of the video feed and obscure the field of vision for a surgeon.

Conventional image processing-based de-smoking approaches assume the smoke as a homogenous scattering media, estimate air-light component and adapt dehazing techniques for removing the smoke based on the air-light component. However, the smoke media is non-homogenous in nature and hence the conventional image processing-based de-smoking approaches may not be effective in the de-smoking. Further, the dehazing techniques introduces color distortions that are not desirable for some critical applications such as minimally invasive surgeries. Conventional data-driven based de-smoking approaches are limited and perform the de-smoking only at video frame level without harnessing dynamic properties of the smoke present in the video.

SUMMARY

Embodiments of the present disclosure present technological improvements as solutions to one or more of the above-mentioned technical problems recognized by the inventors in conventional systems.

In an aspect, there is provided a processor-implemented method, the method comprising the steps of: receiving a plurality of smoke-free videos, wherein each smoke-free video of the plurality of smoke-free videos comprises a plurality of smoke-free video clips, wherein each smoke-free video clip of the plurality of smoke-free video clips comprises a predefined number of smoke-free video frames; obtaining (i) a smoky video for each smoke-free video of the plurality of smoke-free videos, and (ii) a binary smoke segmentation map associated with each smoky video, using a trained smoky video frame generation model, to get a plurality of smoky videos along with binary smoke segmentation maps for the plurality of smoke-free videos, wherein the smoky video for each smoke-free video comprises a plurality of smoky video clips corresponding to the plurality of smoke-free video dips present in the smoke-free video, wherein each smoky video clip comprises a predefined number of synthesized smoky video frames corresponding to the predefined number of smoke-free video frames present in the smoke-free video clip, and the binary smoke segmentation map associated with each smoky video comprises a binary smoke segmentation mask for each synthesized smoky video frame of the predefined number of synthesized smoky video frames present in each smoky video clip; training alternatively (i) an encoder-decoder model present in a de-smoking model, the encoder-decoder model consists of an encoder unit and a decoder unit, wherein the decoder unit comprises a de-smoking decoder unit and a smoke segmentation decoder unit, and (ii) a non-smoky frame critic model present in the de-smoking model, for a predefined consecutive training iterations, with (i) the plurality of smoke-free videos and (ii) the plurality of smoky videos along with the binary smoke segmentation maps for the plurality of smoke-free videos, until a predefined total training iterations are completed, to generate a trained de-smoking model, wherein the trained de-smoking model is generated by: (a) training the encoder-decoder model, for each of the predefined consecutive training iterations, comprises simultaneously training the encoder unit and the decoder unit present in the encoder-decoder model, by: forming one or more smoky video dips out of the plurality of smoky video dips present in each smoky video of the plurality of smoky videos, as a first mini batch, based on a predefined mini batch size; passing the one or more smoky video clips present in the first mini batch, to the encoder unit, to extract (i) frame-level spatial features and (ii) long-term spatio-temporal features, for each smoky video dip of the one or more smoky video clips; passing (i) the frame-level spatial features and (ii) the long-term spatio-temporal features, for each smoky video clip of the one or more smoky video dips, to the de-smoking decoder unit and the smoke segmentation decoder unit, to obtain a predicted de-smoked video dip for each smoky video clip and a predicted smoke segmentation map for each smoky video dip, respectively; passing the predicted de-smoked video dip for each smoky video clip, to the non-smoky frame critic model, to obtain a predicted de-smoking confidence score for each smoky video clip; optimizing a total objective function of the encoder-decoder model, wherein the total objective function comprises: (a) a de-smoking objective function which calculates an error between (i) the predicted de-smoked video clip corresponding to each smoky video dip and (ii) the smoke-free video dip corresponding to each smoky video dip; (b) a segmentation objective function which calculates the error between (i) the predicted smoke segmentation map corresponding to each smoky video clip and (ii) the binary smoke segmentation mask for each smoky video frame of the predefined number of smoky video frames corresponding to each smoky video dip; and (c) a non-smoky critic objective function which calculates the error between (i) the predicted de-smoking confidence score for each smoky video clip, and (ii) a predefined de-smoking confidence score; and updating weights of the encoder unit and the decoder unit; based on the total objective function; and (b) training the non-smoky frame critic model, for each of the predefined consecutive training iterations, comprises: forming the one or more smoky video dips out of the plurality of smoky video dips present in each smoky video of the plurality of smoky videos, as a second mini batch, based on the predefined mini batch size; passing the one or more smoky video dips present in the second mini batch, to the encoder unit, to extract (i) the frame-level spatial features and (ii) the long-term spatio-temporal features, for each smoky video dip of the one or more smoky video dips; passing (i) the frame-level spatial features and (ii) the long-term spatio-temporal features, for each smoky video clip of the one or more smoky video clip to the de-smoking decoder unit and the smoke segmentation decoder unit, to obtain the predicted de-smoked video clip for each smoky video clip and the predicted smoke segmentation map for each smoky video clip, respectively; passing the predicted de-smoked video clip for each smoky video clip, to the non-smoky frame critic model, to obtain the predicted de-smoking confidence score for each smoky video clip; passing the smoke-free video clip corresponding to each smoky video clip, to the non-smoky frame critic model, to obtain a predicted smoke-free confidence score for each smoke-free video clip; optimizing a critic objective function, wherein the critic objective function comprises: (i) a de-smoking score objective function which calculates the error between (a) the predicted de-smoking confidence score corresponding to the smoky video clip and (b) the predefined de-smoking confidence score, and (ii) a smoke-free score objective function which calculates the error between (a) the predicted smoke-free confidence score for each smoke-free video clip and (b) a predefined smoke-free confidence score; and updating the weights of the non-smoky frame critic model based on the critic objective function; receiving an input smoky video for which smoke to be removed, wherein the input smoky video comprises one or more input smoky video clips, wherein each input smoky video clip of the one or more input smoky video clips comprises a predefined number of input smoky video frames; pass each input smoky video clip, at a time, of the one or more input smoky video cups, to the trained de-smoking model, to obtain (i) the de-smoked video clip for each input smoky video clip of the one or more input smoky video clips, and (ii) a smoke segmentation map for each input smoky video dip of the one or more input smoky video dips; and stitch the de-smoked video dip for each input smoky video dip of the one or more input smoky video dips, to obtain the de-smoked video for the input smoky video.

In another aspect, there is provided a system, the system comprising: a memory storing instructions; one or more Input/Output (I/O) interfaces; and one or more hardware processors coupled to the memory via the one or more I/O interfaces, wherein the one or more hardware processors are configured by the instructions to: receive a plurality of smoke-free videos, wherein each smoke-free video of the plurality of smoke-free videos comprises a plurality of smoke-free video dips, wherein each smoke-free video dip of the plurality of smoke-free video dips comprises a predefined number of smoke-free video frames; obtain (i) a smoky video for each smoke-free video of the plurality of smoke-free videos, and (ii) a binary smoke segmentation map associated with each smoky video, using a trained smoky video frame generation model, to get a plurality of smoky videos along with binary smoke segmentation maps for the plurality of smoke-free videos, wherein the smoky video for each smoke-free video comprises a plurality of smoky video dips corresponding to the plurality of smoke-free video dips present in the smoke-free video, wherein each smoky video clip comprises a predefined number of synthesized smoky video frames corresponding to the predefined number of smoke-free video frames present in the smoke-free video dip, and the binary smoke segmentation map associated with each smoky video comprises a binary smoke segmentation mask for each synthesized smoky video frame of the predefined number of synthesized smoky video frames present in each smoky video dip; train alternatively (i) an encoder-decoder model present in a de-smoking model, the encoder-decoder model consists of an encoder unit and a decoder unit, wherein the decoder unit comprises a de-smoking decoder unit and a smoke segmentation decoder unit, and (ii) a non-smoky frame critic model present in the de-smoking model, for a predefined consecutive training iterations, with (i) the plurality of smoke-free videos and (ii) the plurality of smoky videos along with the binary smoke segmentation maps for the plurality of smoke-free videos, until a predefined total training iterations are completed, to generate a trained de-smoking model, wherein the trained de-smoking model is generated by: (a) training the encoder-decoder model, for each of the predefined consecutive training iterations, comprises simultaneously training the encoder unit and the decoder unit present in the encoder-decoder model, by: forming one or more smoky video clips out of the plurality of smoky video dips present in each smoky video of the plurality of smoky videos, as a first mini batch, based on a predefined mini batch size; passing the one or more smoky video clips present in the first mini batch, to the encoder unit, to extract (i) frame-level spatial features and (ii) long-term spatia-temporal features, for each smoky video clip of the one or more smoky video clips; passing (i) the frame-level spatial features and (ii) the long-term spatia-temporal features, for each smoky video clip of the one or more smoky video clips, to the de-smoking decoder unit and the smoke segmentation decoder unit, to obtain a predicted de-smoked video clip for each smoky video clip and a predicted smoke segmentation map for each smoky video clip, respectively; passing the predicted de-smoked video clip for each smoky video clip, to the non-smoky frame critic model, to obtain a predicted de-smoking confidence score for each smoky video clip; optimizing a total objective function of the encoder-decoder model, wherein the total objective function comprises: (a) a de-smoking objective function which calculates an error between (i) the predicted de-smoked video clip corresponding to each smoky video clip and (ii) the smoke-free video clip corresponding to each smoky video clip; (b) a segmentation objective function which calculates the error between (i) the predicted smoke segmentation map corresponding to each smoky video clip and (ii) the binary smoke segmentation mask for each smoky video frame of the predefined number of smoky video frames corresponding to each smoky video clip; and (c) a non-smoky critic objective function which calculates the error between (i) the predicted de-smoking confidence score for each smoky video clip, and (ii) a predefined de-smoking confidence score; and updating weights of the encoder unit and the decoder unit, based on the total objective function; and (b) training the non-smoky frame critic model, for each of the predefined consecutive training iterations, comprises: forming the one or more smoky video clips out of the plurality of smoky video dips present in each smoky video of the plurality of smoky videos, as a second mini batch, based on the predefined mini batch size; passing the one or more smoky video dips present in the second mini batch, to the encoder unit, to extract (i) the frame-level spatial features and (ii) the long-term spatia-temporal features, for each smoky video dip of the one or more smoky video dips; passing (i) the frame-level spatial features and (ii) the long-term spatia-temporal features, for each smoky video dip of the one or more smoky video dips, to the de-smoking decoder unit and the smoke segmentation decoder unit, to obtain the predicted de-smoked video dip for each smoky video dip and the predicted smoke segmentation map for each smoky video dip, respectively; passing the predicted de-smoked video clip for each smoky video clip; to the non-smoky frame critic model, to obtain the predicted de-smoking confidence score for each smoky video clip; passing the smoke-free video clip corresponding to each smoky video clip, to the non-smoky frame critic model, to obtain a predicted smoke-free confidence score for each smoke-free video clip; optimizing a critic objective function, wherein the critic objective function comprises: (i) a de-smoking score objective function which calculates the error between (a) the predicted de-smoking confidence score corresponding to the smoky video clip and (b) the predefined de-smoking confidence score, and (ii) a smoke-free score objective function which calculates the error between (a) the predicted smoke-free confidence score for each smoke-free video clip and (b) a predefined smoke-free confidence score; and updating the weights of the non-smoky frame critic model based on the critic objective function; receive an input smoky video for which smoke to be removed, wherein the input smoky video comprises one or more input smoky video dips, wherein each input smoky video clip of the one or more input smoky video clips comprises a predefined number of input smoky video frames; pass each input smoky video dip, at a time, of the one or more input smoky video dips, to the trained de-smoking model, to obtain (i) the de-smoked video dip for each input smoky video clip of the one or more input smoky video dips, and (ii) a smoke segmentation map for each input smoky video dip of the one or more input smoky video dips; and stitch the de-smoked video dip for each input smoky video dip of the one or more input smoky video clips, to obtain the de-smoked video for the input smoky video.

In yet another aspect, there is provided a computer program product comprising a non-transitory computer readable medium having a computer readable program embodied therein, wherein the computer readable program, when executed on a computing device, causes the computing device to: receive a plurality of smoke-free videos, wherein each smoke-free video of the plurality of smoke-free videos comprises a plurality of smoke-free video dips, wherein each smoke-free video dip of the plurality of smoke-free video dips comprises a predefined number of smoke-free video frames; obtain (i) a smoky video for each smoke-free video of the plurality of smoke-free videos, and (ii) a binary smoke segmentation map associated with each smoky video, using a trained smoky video frame generation model, to get a plurality of smoky videos along with binary smoke segmentation maps for the plurality of smoke-free videos, wherein the smoky video for each smoke-free video comprises a plurality of smoky video clips corresponding to the plurality of smoke-free video clips present in the smoke-free video, wherein each smoky video clip comprises a predefined number of synthesized smoky video frames corresponding to the predefined number of smoke-free video frames present in the smoke-free video clip, and the binary smoke segmentation map associated with each smoky video comprises a binary smoke segmentation mask for each synthesized smoky video frame of the predefined number of synthesized smoky video frames present in each smoky video clip; train alternatively (i) an encoder-decoder model present in a de-smoking model, the encoder-decoder model consists of an encoder unit and a decoder unit, wherein the decoder unit comprises a de-smoking decoder unit and a smoke segmentation decoder unit, and (ii) a non-smoky frame critic model present in the de-smoking model, for a predefined consecutive training iterations, with (i) the plurality of smoke-free videos and (ii) the plurality of smoky videos along with the binary smoke segmentation maps for the plurality of smoke-free videos, until a predefined total training iterations are completed, to generate a trained de-smoking model, wherein the trained de-smoking model is generated by: (a) training the encoder-decoder model, for each of the predefined consecutive training iterations, comprises simultaneously training the encoder unit and the decoder unit present in the encoder-decoder model, by: forming one or more smoky video clips out of the plurality of smoky video clips present in each smoky video of the plurality of smoky videos, as a first mini batch, based on a predefined mini batch size; passing the one or more smoky video clips present in the first mini batch, to the encoder unit, to extract (i) frame-level spatial features and (ii) long-term spatia-temporal features, for each smoky video clip of the one or more smoky video clips; passing (i) the frame-level spatial features and (ii) the long-term spatia-temporal features, for each smoky video clip of the one or more smoky video clips, to the de-smoking decoder unit and the smoke segmentation decoder unit, to obtain a predicted de-smoked video clip for each smoky video clip and a predicted smoke segmentation map for each smoky video clip, respectively; passing the predicted de-smoked video clip for each smoky video clip, to the non-smoky frame critic model, to obtain a predicted de-smoking confidence score for each smoky video clip; optimizing a total objective function of the encoder-decoder model, wherein the total objective function comprises: (a) a de-smoking objective function which calculates an error between (i) the predicted de-smoked video dip corresponding to each smoky video dip and (ii) the smoke-free video dip corresponding to each smoky video dip; (b) a segmentation objective function which calculates the error between (i) the predicted smoke segmentation map corresponding to each smoky video clip and (ii) the binary smoke segmentation mask for each smoky video frame of the predefined number of smoky video frames corresponding to each smoky video clip; and (c) a non-smoky critic objective function which calculates the error between (i) the predicted de-smoking confidence score for each smoky video clip, and (ii) a predefined de-smoking confidence score; and updating weights of the encoder unit and the decoder unit, based on the total objective function; and (b) training the non-smoky frame critic model, for each of the predefined consecutive training iterations, comprises: forming the one or more smoky video clips out of the plurality of smoky video clips present in each smoky video of the plurality of smoky videos, as a second mini batch, based on the predefined mini batch size; passing the one or more smoky video clips present in the second mini batch, to the encoder unit, to extract (i) the frame-level spatial features and (ii) the long-term spatia-temporal features, for each smoky video clip of the one or more smoky video clips; passing (i) the frame-level spatial features and (ii) the long-term spatia-temporal features, for each smoky video clip of the one or more smoky video clips, to the de-smoking decoder unit and the smoke segmentation decoder unit, to obtain the predicted de-smoked video dip for each smoky video dip and the predicted smoke segmentation map for each smoky video dip, respectively; passing the predicted de-smoked video dip for each smoky video dip, to the non-smoky frame critic model, to obtain the predicted de-smoking confidence score for each smoky video dip; passing the smoke-free video dip corresponding to each smoky video dip, to the non-smoky frame critic model, to obtain a predicted smoke-free confidence score for each smoke-free video dip; optimizing a critic objective function, wherein the critic objective function comprises: (i) a de-smoking score objective function which calculates the error between (a) the predicted de-smoking confidence score corresponding to the smoky video clip and (b) the predefined de-smoking confidence score, and (ii) a smoke-free score objective function which calculates the error between (a) the predicted smoke-free confidence score for each smoke-free video dip and (b) a predefined smoke-free confidence score; and updating the weights of the non-smoky frame critic model based on the critic objective function; receive an input smoky video for which smoke to be removed, wherein the input smoky video comprises one or more input smoky video dips, wherein each input smoky video dip of the one or more input smoky video dips comprises a predefined number of input smoky video frames; pass each input smoky video clip, at a time, of the one or more input smoky video clips, to the trained de-smoking model, to obtain (i) the de-smoked video clip for each input smoky video clip of the one or ore input smoky video dips, and (ii) a smoke segmentation map for each input smoky video dip of the one or more input smoky video dips; and stitch the de-smoked video dip for each input smoky video dip of the one or more input smoky video dips, to obtain the de-smoked video for the input smoky video.

In an embodiment, the trained smoky video frame generation model is obtained by: receiving a natural smoky video frames dataset and a natural smoke-free video frames dataset, wherein the natural smoky video frames dataset comprises a plurality of natural smoky video frames and the natural smoke-free video frames dataset comprises a plurality of natural smoke-free video frames; training alternatively, a smoke frame critic model and a smoke parameter generation model present in a smoky video frame generation model, for predefined consecutive synthesis training iterations, with (i) the natural smoky video frames dataset and (ii) the natural smoke-free video frames dataset, until predefined total synthesis training iterations are completed, wherein: (a) training the smoke frame critic model for each of the predefined consecutive synthesis training iterations, comprises: forming (i) one or more natural smoke-free video frames out of the plurality of natural smoke-free video frames present in the natural smoke-free video frames dataset, as a third mini batch, and (H) one or more natural smoky video frames out of the plurality of natural smoky video frames present in the natural smoky video frames dataset, as a fourth mini batch, based on a predefined mini batch size; generating a set of source aware smoke synthesis parameters, for each natural smoke-free video frame of the one or more natural smoke-free video frames present in the third mini batch, using a current state of the smoke parameter generation model; generating a synthesized smoky video frame for each natural smoke-free video frame of the one or more natural smoke-free video frames present in the third mini batch, using a smoke synthesis model present in the smoky video frame generation model, based on the set of source aware smoke synthesis parameters corresponding to each natural smoke-free video frame, to obtain one or more synthesized smoky video frames for the one or more natural smoke-free video frames; passing the one or more natural smoky video frames present in the fourth mini batch, to the smoke frame critic model, to obtain a natural smoky video frame confidence score for each natural smoky video frame of the one or more natural smoky video frames; passing the one or more synthesized smoky video frames, to the smoke frame critic model, to obtain a predicted smoky video frame confidence score for each synthesized smoky video frame of the one or more synthesized smoky video frames; optimizing a smoke frame critic objective function comprising a natural score objective function and a synthetic score objective function, wherein the natural score objective function calculates an error between the natural smoky video frame confidence score for each natural smoky video frame and a predefined natural smoky video frame confidence score, and the synthetic score objective function calculates the error between the predicted smoky video frame confidence score for each synthesized smoky video frame and a predefined predicted smoky video frame confidence score; and updating weights of the smoke frame critic model, based on the smoke frame critic objective function; and (b) training the smoke parameter generation model for each of the predefined consecutive synthesis training iterations, comprises: forming one or more natural smoke-free video frames out of the plurality of natural smoke-free video frames present in the natural smoke-free video frames dataset, as a fifth mini batch, based on the predefined mini batch size; generating the set of source aware smoke synthesis parameters, for each natural smoke-free video frame of the one or more natural smoke-free video frames present in the fifth mini batch, using the current state of the smoke parameter generation model; generating the synthesized smoky video frame for each natural smoke-free video frame of the one or more natural smoke-free video frames present in the fifth mini batch, using the smoke synthesis model present in the smoky video frame generation model, based on the set of source aware smoke synthesis parameters corresponding to each natural smoke-free video frame, to obtain the one or more synthesized smoky video frames for the one or more natural smoke-free video frames; passing the one or more synthesized smoky video frames, to the smoke frame critic model, to obtain the predicted smoky video frame confidence score for each synthesized smoky video frame of the one or more predicted smoky video frames; optimizing a smoke parameter generation objective function which calculates the error between the predicted smoky video frame confidence score for each synthesized smoky video frame and the predefined predicted smoky video frame confidence score; and updating weights of the smoke parameter generation model, based on the smoke parameter generation objective function.

In an embodiment, the set of source aware smoke synthesis parameters comprises: (i) a smoke source location, (ii) a smoke source shape, (iii) a velocity of the smoke, and (iv) a density of the smoke.

In an embodiment, the smoke frame critic model and the smoke parameter generation model are convolutional neural networks.

In an embodiment, the smoky video for each smoke-free video of the plurality of smoke-free videos, and (ii) the binary smoke segmentation map associated with each smoky video, using the trained smoky video frame generation model, are obtained by: passing each smoke-free video frame at a time, out of the predefined number of smoke-free video frames present in each smoke-free clip of the plurality of smoke-free dips present in each smoke-free video, to the trained smoky video frame generation model, to generate (i) the synthesized smoky video frame for each smoke-free video frame and (ii) the binary smoke segmentation mask associated with the synthesized smoky video frame; and combining (i) the synthesized smoky video frame for each smoke-free frame out of the predefined number of smoke-free video frames present in each smoke-free clip of the plurality of smoke-free clips present in each smoke-free video, to obtain the smoky video for each smoke-free video, and (ii) the binary smoke segmentation mask associated with the synthesized smoky video frame obtained for each smoke-free video frame out of the predefined number of smoke-free video frames present in each smoke-free video clip of the plurality of smoke-free video clips present in each smoke-free video, to obtain the binary smoke segmentation map associated with each smoky video.

In an embodiment, the frame-level spatial features for each smoky video clip, are extracted by using a convolutional neural network (CNN) present in the encoder unit of the encoder-decoder model.

In an embodiment, the long-term spatio-temporal features for each smoky video clip are extracted by: obtaining an optical flow information for each smoky video clip, using a flow information extraction technique; passing each smoky video clip to a first 3-dimensional (3-D) convolutional neural network (CNN) present in the encoder unit of the encoder-decoder model, to obtain a short-term spatia-temporal features associated with RGB stream; passing the optical flow information for each smoky video clip to a second 3-D CNN present in the encoder unit of the encoder-decoder model, to obtain the short-term spatio-temporal features associated with motion stream; concatenating (i) the short-term spatio-temporal features associated with RGB stream and (ii) the short-term spatio-temporal features associated with motion stream, to obtain a concatenated short-term spatio-temporal features for each smoky video clip; and passing the concatenated short-term spatia-temporal features for each smoky video clip, to a recurrent neural network (RNN) present in the encoder unit of the encoder-decoder model, to obtain the long-term spatia-temporal features for each smoky video clip.

In an embodiment, the de-smoking decoder unit present in the decoder unit of the encoder-decoder model, comprises a set of first convolutional network pairs, wherein each first convolutional network pair comprises a 2-dimensional (2-D) transpose convolutional block followed by a 2-D convolutional block; and the smoke segmentation decoder unit present in the decoder unit of the encoder-decoder model, comprises a set of second convolutional network pairs, wherein each second convolutional network pair comprises the 2-dimensional (2-D) transpose convolutional block followed by the 2-D convolutional block.

It is to be understood that both the foregoing general description and the following detailed description are exemplary and explanatory only and are not restrictive of the embodiments of the present disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 4A and FIG. 4B illustrate exemplary flow diagrams for training a smoke frame critic model for each of predefined consecutive synthesis training iterations, in accordance with some embodiments of the present disclosure.

FIG. 5A and FIG. 5B illustrate exemplary flow diagrams for training a smoke parameter generation model for each of the predefined consecutive synthesis training iterations, in accordance with some embodiments of the present disclosure.

FIG. 7A and FIG. 7B illustrate exemplary flow diagrams for training an encoder-decoder model for each of predefined consecutive training iterations, in accordance with some embodiments of the present disclosure.

FIG. 8A and FIG. 8B illustrate exemplary flow diagrams for training a non-smoky frame critic model for each of the predefined consecutive training iterations, in accordance with some embodiments of the present disclosure.

DETAILED DESCRIPTION OF EMBODIMENTS

Figure 1:
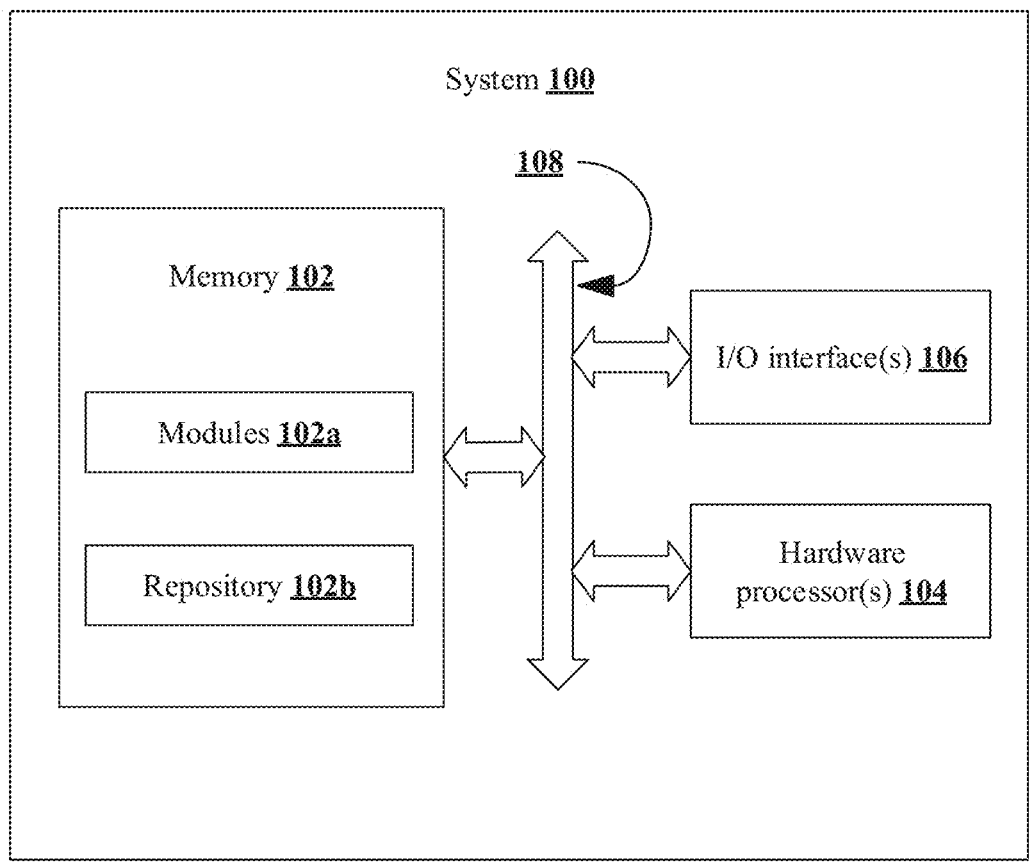
FIG. 1 is an exemplary block diagram of a system for generating an end-to-end de-smoking model, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Conventional data-driven based de-smoking approaches for removing smoke present in the video, use video frames affected with the smoke or use synthetic smoke to generate the smoky frames for training a de-smoking model. Obtaining smoke-free video frames corresponding to the video frames affected with the smoke, is sometimes challenging and infeasible. The smoke synthesized in the video frame may be independent of smoke synthesized in succeeding video frames, and a resultant training dataset used for generating the de-smoking model, does not replicate a fluid nature of the smoke. Hence the conventional data-driven based de-smoking approaches may not be accurate and are limited mainly due to lack of suitable training data.

The present disclosure herein provides methods and systems for generating an end-to-end de-smoking model to remove the smoke (also referred as 'plume') present in the video. The de-smoking model is trained end-to-end with the use of synthesized smoky video frames that are obtained by source aware smoke synthesis approach. The end-to-end de-smoking model localizes and removes the smoke present in the video, using dynamic properties of the smoke. Hence the end-to-end de-smoking model simultaneously identifies the regions affected with the smoke and performs the de-smoking with minimal artifacts.

Referring now to the drawings, and more particularly to FIG. 1 through FIG. 9, where similar reference characters denote corresponding features consistently throughout the figures, there are shown preferred embodiments and these embodiments are described in the context of the following exemplary systems and/or methods.

FIG. 1 is an exemplary block diagram of a system 100 for generating an end-to-end de-smoking model, in accordance with some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In the context of the present disclosure, the expressions 'processors' and 'hardware processors' may be used interchangeably. In an embodiment, the system 100 can be implemented in a variety of computing systems, such as laptop computers, portable computers, notebooks, hand-held devices, workstations, mainframe computers, servers, a network cloud and the like.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102a and a repository 102b for storing data processed, received, and generated by one or more of the plurality of modules 102a, The plurality of modules 102a may include routines, programs, objects, components, data structures, and so on, which perform particular tasks or implement particular abstract data types.

The plurality of modules 102a may include programs or computer-readable instructions or coded instructions that supplement applications or functions performed by the system 100. The plurality of modules 102a may also be used as, signal processor(s), state machine(s), logic circuitries, and/or any other device or component that manipulates signals based on operational instructions. Further, the plurality of modules 102a can be used by hardware, by computer-readable instructions executed by the one or more hardware processors 104, or by a combination thereof. In an embodiment, the plurality of modules 102a can include various sub-modules (not shown in FIG. 1). Further, the memory 102 may include information pertaining to input(s)/output(s) of each step performed by the processor(s) 104 of the system 100 and methods of the present disclosure.

The repository 102b may include a database or a data engine. Further, the repository 102b amongst other things, may serve as a database or includes a plurality of databases for storing the data that is processed, received, or generated as a result of the execution of the plurality of modules 102a, Although the repository 102a is shown internal to the system 100, it will be noted that, in alternate embodiments, the repository 102b can also be implemented external to the system 100, where the repository 102b may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102b may be distributed between the system 100 and the external database.

Figure 2A:
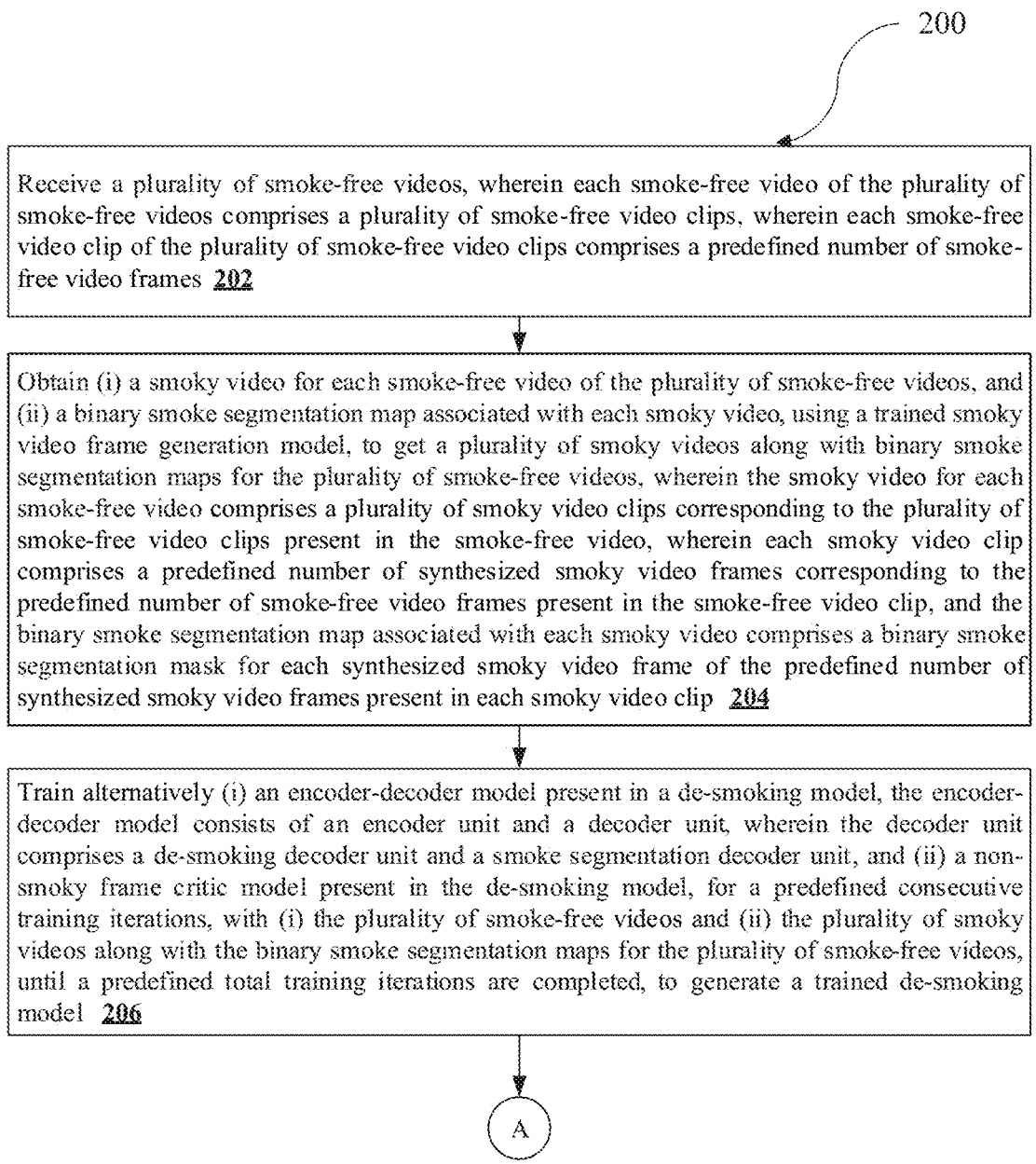
FIG. 2A and FIG. 2B illustrate exemplary flow diagrams of a processor-implemented method for generating the end-to-end de-smoking model, in accordance with some embodiments of the present disclosure.
Figure 2B:
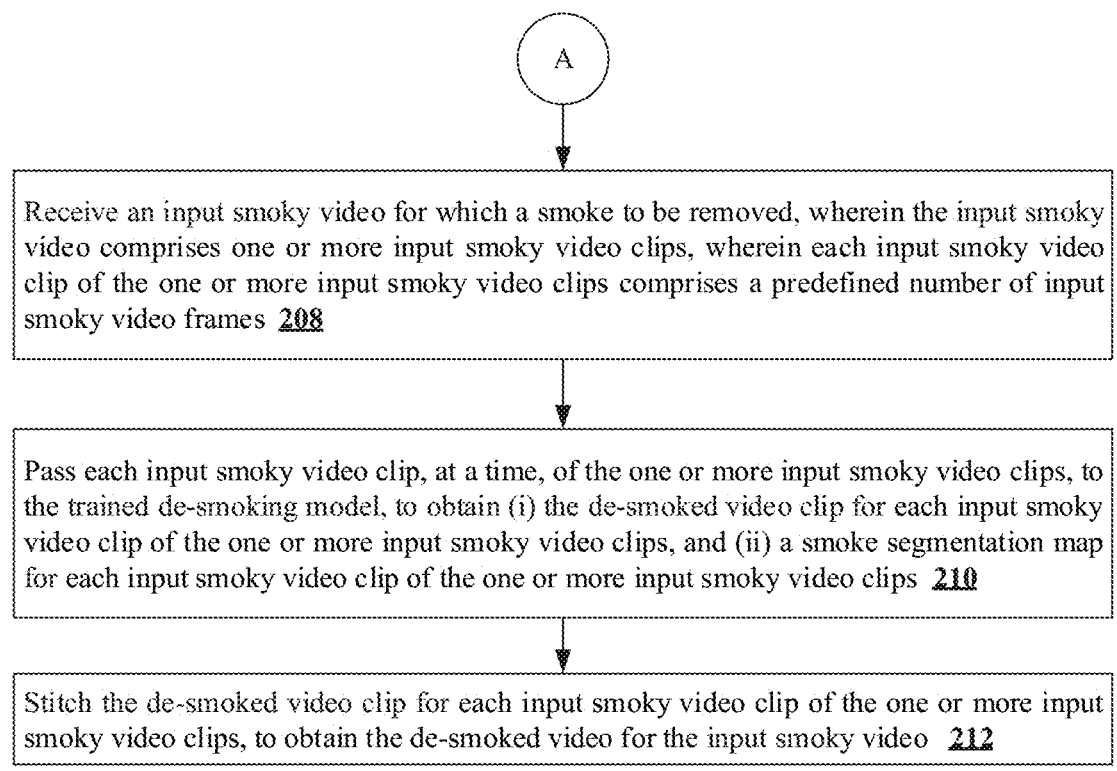

Referring to FIG. 2A and FIG. 2B, components and functionalities of the system 100 are described in accordance with an example embodiment of the present disclosure. For example, FIG. 2A and FIG. 2B illustrate exemplary flow diagrams of a processor-implemented method 200 for generating the end-to-end de-smoking model, in accordance with some embodiments of the present disclosure. Although steps of the method 200 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously, or some steps may be performed alone or independently.

At step 202 of the method 200, the one or more hardware processors 104 of the system 100 are configured to receive a plurality of smoke-free videos. Each smoke-free video of the plurality of smoke-free videos includes a plurality of smoke-free video dips. In an embodiment, a number of the plurality of smoke-free video dip present in each smoke-free video may be different or same. Each smoke-free video dip of the plurality of smoke-free video dips associated with each smoke-free video includes a predefined number of smoke-free video frames. For example, the plurality of smoke-free video clips may be 10.

Each smoke-free video frame of the predefined number of smoke-free video frames may be identified by a unique frame index. For example, the first smoke-free video frame may have the frame index '1', the second video frame may have the frame index '2', and so on. Similarly, each smoke-free video clip of the plurality of smoke-free video clips associated with each smoke-free video may be identified by a unique clip index. In an embodiment, the plurality of smoke-free videos may be stored in the repository 102b of the system 100.

At step 204 of the method 200, the one or more hardware processors 104 of the system 100 are configured to obtain (i) a smoky video for each smoke-free video of the plurality of smoke-free videos received at step 202 of the method 200, and (ii) a binary smoke segmentation map associated with each smoky video. The smoky video for each smoke-free video includes the smoke. The binary smoke segmentation map associated with each smoky video indicates whether the smoke is present or not at each pixel location in the smoky video.

A trained smoky video frame generation model is used to obtain (i) the smoky video for each smoke-free video of the plurality of smoke-free videos, and (ii) the binary smoke segmentation map associated with each smoky video. A plurality of smoky videos along with corresponding binary smoke segmentation maps are obtained for the plurality of smoke-free videos received at step 202 of the method 200. The smoky video for each smoke-free video includes a plurality of smoky video dips corresponding to the plurality of smoke-free video dips present in the smoke-free video. The smoky video for each smoke-free video is a synthesized smoky video obtained by synthesizing the corresponding smoke-free video with the smoke.

Each smoky video dip includes a predefined number of synthesized smoky video frames corresponding to the predefined number of smoke-free video fames present in the smoke-free video dip. The binary smoke segmentation map associated with each smoky video incudes a binary smoke segmentation mask for each synthesized smoky video frame of the predefined number of smoky video frames present in each smoky video dip. The binary smoke segmentation mask for each synthesized smoky video frame defines regions where the smoke is present in the corresponding smoky video frame.

Figure 3:
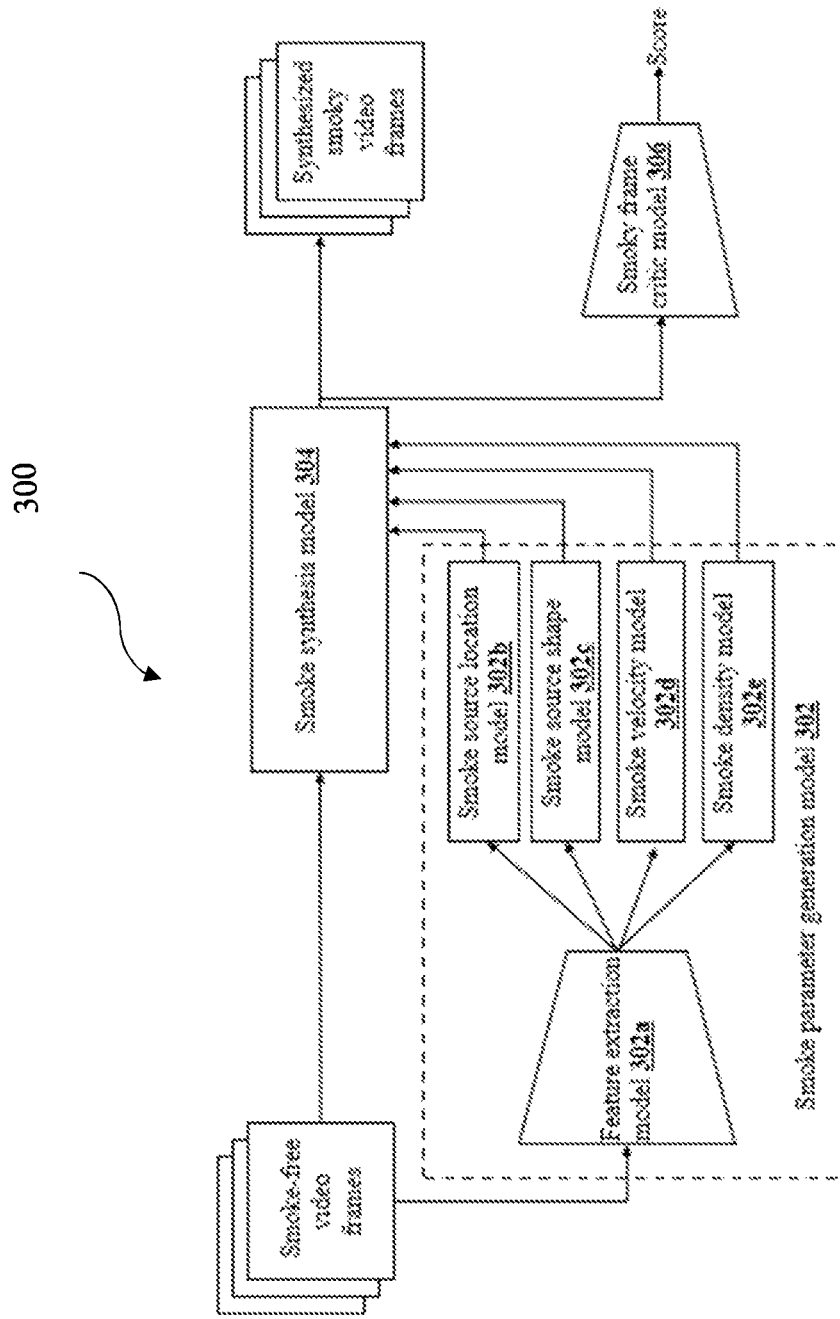
FIG. 3 is an exemplary architecture of a smoky video frame generation model, in accordance with some embodiments of the present disclosure.

A trained smoky video frame generation model is obtained by training a smoky video frame generation model. FIG. 3 is an exemplary architecture of the smoky video frame generation model 300, in accordance with some embodiments of the present disclosure. As shown in FIG. 3, the smoky video frame generation model 300 includes a smoke parameter generation model 302, a smoke synthesis model 304, and a smoke frame critic model 306. The smoke parameter generation model 302 further includes a feature extraction model 302a, a smoke source location model 302b, a smoke source shape model 302c, a smoke velocity model 302d, and a smoke density model 302e.

In an embodiment, the feature extraction model 302a may be a convolutional neural network such as a ResNet50. Also, the smoke source location model 302b, the smoke source shape model 302c, the smoke velocity model 302d, and the smoke density model 302e, may be the convolutional neural networks (CNNs). The smoke parameter generation model 302 takes smoke-free frames as an input and outputs a set of source aware smoke synthesis parameters which are used to generate the smoke.

In an embodiment, the set of source aware smoke synthesis parameters include: (i) a smoke source location (loc), (ii) a smoke source shape ($S_{shp}$), (iii) a velocity of smoke (v), and (iv) a density of the smoke (ρ). The smoke source location model 302b is configured to generate the smoke source location (loc), the smoke source shape model 302c is configured to generate the smoke source shape ($S_{shp}$), the smoke velocity model 302d is configured to generate the velocity of the smoke (v), and the smoke density model 302e is configured to generate the density of the smoke (ρ).

The smoke source location (loc) defines a location (defined in terms of pixels) at which the smoke is to be generated. For example, for loc=(10, 10), the smoke is generated at pixel location=(10,10). The smoke source shape ($S_{shp}$) defines a shape of the smoke source and is represented as an image (2-dimensional (2-D) shape mask) with height $\hat{h}$ and width $\hat{W}$. The velocity of the smoke (v) defines the velocity of the smoke to be generated and the density of the smoke (φ defines the density of the smoke to be generated. Here, ρ, v $\in \mathbb{R}^+$ (a positive real number), loc $\in \mathbb{R}^{+2}$, and $S_{shp} \in \mathbb{R}^{\hat{H}\hat{W}}$ (a real number).

The input to the feature extraction model 302a is of the format [T, height, width, channel]. Here T represents a number of video frames, height represents a height of the video frame, width represents a width of the video frame, and channel represents a channel of the network model. The height and width for each video frame are uniform and predefined.

The feature extraction model 302a takes the smoke-free video frames as the input and generates the backbone features for each smoke-free video frame. Table 1a shows an input feature size and an output feature size defined for a pre-decided layer of the feature extraction model 302a, in case of the ResNet50.

TABLE 1a

| Layers | Input feature size | Output feature size |
| --- | --- | --- |
| ResNet50 conv3 block1 out | T, 224, 224, 3 | T, 28, 28, 512 (Backbone features) |

The smoke source location model 302b takes the backbone features generated for each smoke-free video frame by the feature extraction model 302a, as the input and generates the smoke source location (loc) for each smoke-free video frame. Table 1b shows the input feature size and the output feature size defined for each layer of the smoke source location model 302b.

TABLE 1b

| Layers | Input feature size | Output feature size |
| --- | --- | --- |
| Conv + ReLu layers | T, 28, 28, 512 (Backbone features) | T, 28, 28, 512 |
| Global Average Pooling (GAP) layer | T, 28, 28, 512 | T, 512 |
| Dense + ReLu layers | T, 512 | T, 2 (source location) |

The smoke source shape model 302c takes the backbone features generated for each smoke-free video frame by the feature extraction model 302a, as the input and generates the smoke source shape ($S_{shp}$) for each smoke-free video frame, Table 1c shows the input feature size and the output feature size defined for each layer of the smoke source shape model 302c.

TABLE 1c

| Layers | Input feature size | Output feature size |
| --- | --- | --- |
| Conv + ReLu layers | T, 28, 28, 512 (Backbone features) | T, 28, 28, 256 |
| Conv + ReLu layers | T, 28, 28, 256 | T, 28, 28, 128 |
| Dense + Sigmoid layers | T, 28, 28, 128 | T, 28, 28, 1 (source shape) |

The smoke velocity model 302d takes the backbone features generated for each smoke-free frame by the feature extraction model 302a, as the input and generates the velocity of the smoke (v) for each smoke-free video frame. Table 1 d shows the input feature size and the output feature size defined for each layer of the smoke velocity model 302d.

TABLE 1d

| Layers | Input feature size | Output feature size |
| --- | --- | --- |
| Conv + ReLu layers | T, 28, 28, 512 (Backbone features) | T, 28, 28, 512 |
| Global Average Pooling (GAP) layer | T, 28, 28, 512 | T, 512 |
| Dense + ReLu layers | T, 512 | T, 1 (velocity) |

The smoke density model 302e takes the backbone features generated for each smoke-free frame by the feature extraction model 302a, as the input and generates the density of the smoke (p) for each smoke-free video frame. Table 1 e shows the input feature size and the output feature size defined for each layer of the smoke density model 302e.

TABLE 1e

| Layers | Input feature size | Output feature size |
| --- | --- | --- |
| Conv + ReLu layers | T, 28, 28, 512 (Backbone features) | T, 28, 28, 512 |
| Global Average Pooling (GAP) layer | T, 28, 28, 512 | T, 512 |
| Dense + ReLu layers | T, 512 | T, 1 (density) |

The smoke synthesis model 304 is a differential smoke simulator that takes smoke-free frames and the set of source aware smoke synthesis parameters generated by the smoke parameter generation model 302 as an input and generates synthesized smoky video frames (smoky video frame for each smoke-free video frame), Along with the synthesized smoky video frames, the binary smoke segmentation mask is also generated for each smoky video frame.

The smoke frame critic model 306 is the convolutional neural network (CNN) and generates a learning signal required to train the smoke parameter generation model 302. Further, the smoke frame critic model 306 distinguishes natural smoky video frames from that of synthesized smoky video frames and is achieved by outputting a score ranging from 0 to 1, at the frame level. The score of 1 indicates that the input to the smoke frame critic model 306 is a natural smoky video frame, and while the score of 0 indicates that the input to the smoke frame critic model 306 is a synthesized smoky video frame.

The smoke frame critic model 306 takes the natural smoky video frames and the synthesized smoky video frames generated by the smoke synthesis model 304, and then tries to distinguish between each natural smoky video frame and the synthesized smoky video frame. Table 2 shows the input feature size and the output feature size defined for each layer of the smoke frame critic model 306.

TABLE 2

| Layers | Input feature size | Output feature size |
| --- | --- | --- |
| Conv + LeakyReLu layers | T, 224, 224, 3 (Input frame) | T, 112, 112, 64 |
| Conv + LeakyReLu layers | T, 112, 112, 64 | T, 56, 56, 128 |
| Conv + LeakyReLu layers | T, 56, 56, 128 | T, 28, 28, 256 |
| Conv + LeakyReLu layers | T, 28, 28, 256 | T, 14, 14, 512 |

TABLE 2-continued

| Layers | Input feature size | Output feature size |
| --- | --- | --- |
| Conv + LeakyReLu layers | T, 14, 14, 512 | T, 7, 7, 512 |
| Conv + LeakyReLu layers | T, 7, 7, 512 | T, 3, 3, 512 |
| Flatten layers | T, 3, 3, 512 | T, (3 × 3 × 512) |
| Dense + Sigmoid layers | T, (3 × 3 × 512) | T, 1 (Confidence score) |

Firstly, a natural smoky video frames dataset and a natural smoke-free video frames dataset are received. The natural smoky video frames dataset includes a plurality of natural smoky video frames and the natural smoke-free video frames dataset includes a plurality of natural smoke-free video frames. The plurality of natural smoky video frames may be obtained from a plurality of natural smoky videos. Similarly, the plurality of natural smoke-free video frames may be obtained from a plurality of natural smoky videos. In an embodiment, the natural smoky video frames dataset and the natural smoke-free video frames dataset may be stored in the repository 102b of the system 100. Next the smoky video frame generation model 300 is trained with the natural smoky video frames dataset and the natural smoke-free video frames dataset, to obtain the trained smoky video frame generation model.

More specifically, the trained smoky video frame generation model is obtained by training alternatively, the smoke frame critic model 306 and the smoke parameter generation model 302 present in the smoky video frame generation model 300, for predefined consecutive synthesis training iterations, with (i) the natural smoky video frames dataset and (ii) the natural smoke-free video frames dataset, until predefined total synthesis training iterations are completed. The predefined consecutive synthesis training iterations is always less than the predefined total synthesis training iterations, and the predefined consecutive synthesis training iterations is completely divisible by the predefined total synthesis training iterations. For example, if the predefined consecutive synthesis training iterations is '5' and the predefined total synthesis training iterations is '100', then the smoke frame critic model 306 is trained consecutively for first 5 iterations with the natural smoky video frames dataset and the natural smoke-free video frames dataset. Next, the smoke parameter generation model 302 is trained consecutively for next 5 iterations with the natural smoky video frames dataset and the natural smoke-free video frames dataset, and so on, until the 100 iterations are completed to obtain the trained smoky video frame generation model.

Before the training process, weight of the networks present in the smoke parameter generation model 302 and the smoke frame critic model 306, are initialized randomly. Then, the smoke frame critic model 306 is trained first for the predefined consecutive synthesis training iterations. FIG. 4A and FIG. 4B illustrate exemplary flow diagrams for training the smoke frame critic model 306 for each of the predefined consecutive synthesis training iterations, in accordance with some embodiments of the present disclosure. As shown in FIG. 4A and FIG. 4B, at step 204a1, one or more natural smoke-free video frames are formed as a third mini batch, from the plurality of natural smoke-free video frames present in the natural smoke-free video frames dataset. Similarly, one or more natural smoky video frames are formed as a fourth mini batch from the plurality of natural smoky video frames present in the natural smoky video frames dataset. The number of one or more natural smoke-free video frames in the third mini batch, and the number of the one or more natural smoky video frames in the fourth mini batch are defined by a predefined mini batch size. In an embodiment, the predefined mini batch size may be '10'. The one or more natural smoke-free video frames present in the third mini batch, may be same or different for each training iteration (out of the predefined consecutive synthesis training iterations). Similarly, the one or more natural smoky video frames present in the fourth mini batch may be same or different for each training iteration (out of the predefined consecutive synthesis training iterations).

At step 204a2, the set of source aware smoke synthesis parameters are generated for each natural smoke-free video frame of the one or more natural smoke-free video frames, present in the third mini batch formed at step 204a1, using a current state of the smoke parameter generation model 302. The current state defines a state of the smoke parameter generation model 302 with the weights, at that instance. At step 204a3, a synthesized smoky video frame is generated for each natural smoke-free video frame of the one or more natural smoke-free video frames, present in the third mini batch formed at step 204a1, using the smoke synthesis model 304, based on the set of source aware smoke synthesis parameters generated at step 204a2 corresponding to each natural smoke-free video frame. As a result, one or more synthesized smoky video frames are generated for the one or more natural smoke-free video frames present in the third mini batch formed at step 204a1.

At step 204a4, the one or more natural smoky video frames present in the fourth mini batch are passed to the smoke frame critic model 306, to obtain a natural smoky video frame confidence score for each natural smoky video frame of the one or more natural smoky video frames. The natural smoky video frame confidence score for each natural smoky video frame defines a confidence score that the natural smoky video frame is natural or not, in the range of 0 to 1. If the natural smoky video frame confidence score is 1 or towards 1 (for example, 0.8), then the natural smoky video frame is natural or towards natural. Similarly, the natural smoky video frame confidence score is 0 or towards 0 (for example, 0.1), then the natural smoky video frame is not natural or towards not natural.

At step 204a5, the one or more synthesized smoky video frames generated at step 204a3 are passed to the smoke frame critic model 306, to obtain a predicted smoky video frame confidence score for each synthesized smoky video frame of the one or more synthesized smoky video frames. The predicted smoky video frame confidence score for each synthesized smoky video frame defines the confidence score that the synthesized smoky video frame is natural or not, in the range of 0 to 1.

At step 204a6, a smoke frame critic objective function comprising a natural score objective function and a synthetic score objective function, is optimized. The natural score objective function calculates an error between the natural smoky video frame confidence score for each natural smoky video frame and a predefined natural smoky video frame confidence score. Similarly, the synthetic score objective function calculates the error between the predicted smoky video frame confidence score for each synthesized smoky video frame and a predefined predicted smoky video frame confidence score. In an embodiment, the predefined natural smoky video frame confidence score may be 1. In an embodiment, predefined predicted smoky video frame confidence score may be 0.

The smoke frame critic objective function ($L_{sfc}$) may be mathematically represented as in equation 1:

$$L_{sfc} = BCE(S_{ns}, Y_{ns}) + BCE(S_{ps}, Y_{ps}) \quad (1)$$

where $BCE(S_{ns}, Y_{ns})$ represents the natural score objective function and the error is calculated in terms of a binary cross-entropy (BCE) loss between the natural smoky video frame confidence score ($S_{ns}$) for each natural smoky video frame and the predefined natural smoky video frame confidence score ($Y_{ns}$). Similarly, $BCE(S_{ps}, Y_{ps})$ represents the synthetic score objective function and the error is calculated in terms of the binary cross-entropy (BCE) loss between the predicted smoky video frame confidence score ($S_{ps}$) for each synthesized smoky video frame and the predefined predicted smoky video frame confidence score ($Y_{ps}$).

Lastly, at step 204a7, the weights of the smoke frame critic model 306 are updated at each predefined consecutive synthesis training iteration, based on the smoke frame critic objective function ($L_{sfc}$), until all the predefined consecutive synthesis training iterations are completed.

Figure 5B:
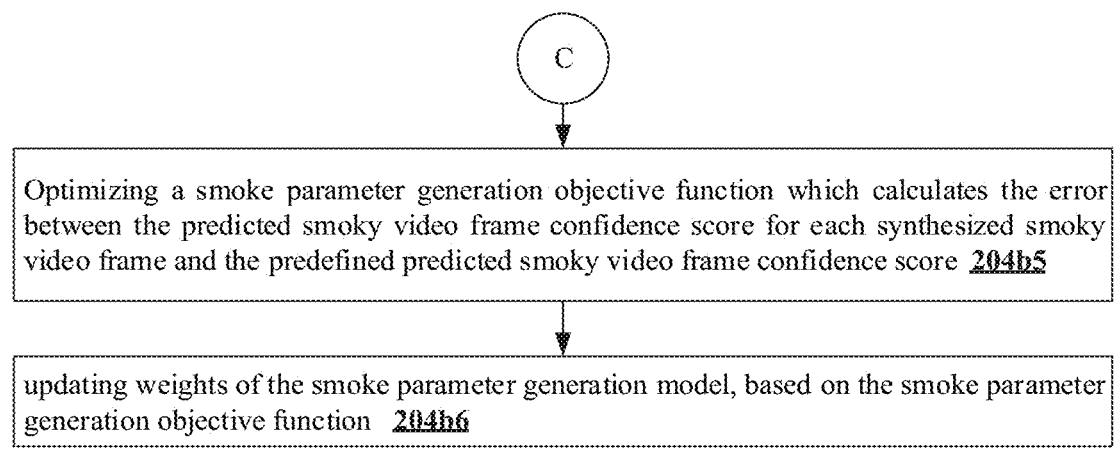

Similarly, the smoke parameter generation model 302 is trained for the predefined consecutive synthesis training iterations. FIG. 5A and FIG. 5B illustrate exemplary flow diagrams for training the smoke parameter generation model 302 for each of the predefined consecutive synthesis training iterations, in accordance with some embodiments of the present disclosure. As shown in FIG. 5A and FIG. 5B, at step 204b1, the one or more natural smoke-free video frames are formed as a fifth mini batch from the plurality of natural smoke-free video frames present in the natural smoke-free video frames dataset. The number of one or more natural smoke-free video frames in the fifth mini batch is defined by the predefined mini batch size. In an embodiment, the predefined mini batch size may be '10'. Further, the one or more natural smoke-free video frames present in the fifth mini batch for each training iteration (out of the predefined consecutive synthesis training iterations) may be same or different, or some video frames may be present in at least one iteration. In an embodiment, the one or more natural smoke-free video frames present in the fifth mini batch need not be same to that of the one or more natural smoke-free video frames present in the third mini batch at step 204a1. However, the mini batch size is same at both steps 204a1 and 204b1.

At step 204b2, the set of source aware smoke synthesis parameters are generated for each natural smoke-free video frame of the one or more natural smoke-free video frames, present in the fifth mini batch formed at step 204b1, using the current state of the smoke parameter generation model 302. The current state defines the state of the smoke parameter generation model 302 with the weights, at that instance.

At step 204b3, a synthesized smoky video frame is generated for each natural smoke-free video frame of the one or more natural smoke-free video frames, present in the fifth mini batch formed at step 204b1, using the smoke synthesis model 304, based on the set of source aware smoke synthesis parameters generated at step 204b2 corresponding to each natural smoke-free video frame. As a result, the one or more synthesized smoky video frames are generated for the one or more natural smoke-free video frames present in the fifth mini batch formed at step 204b1.

At step 204b4, the one or more synthesized smoky video frames generated at step 204b3 are passed to the smoke frame critic model 306, to obtain the predicted smoky video frame confidence score for each synthesized smoky video frame of the one or more synthesized smoky video frames. The predicted smoky video frame confidence score for each synthesized smoky video frame defines the confidence score that the synthesized smoky video frame is natural or not, in the range of 0 to 1.

At step 204b5, a smoke parameter generation objective function is optimized. The smoke parameter generation objective function calculates the error between the predicted smoky video frame confidence score for each synthesized smoky video frame and the predefined predicted smoky video frame confidence score. In an embodiment, predefined predicted smoky video frame confidence score may be 0.

The smoke parameter generation objective function ($L_{spg}$) may be mathematically represented as in equation 2:

$$L_{spg}=BCE(S_{ps},(1-Y_{ps})) \qquad (2)$$

where the error is calculated in terms of a binary cross-entropy (BCE) loss between the predicted smoky video frame confidence score ($S_{ps}$) for each synthesized smoky video frame and the predefined predicted smoky video frame confidence score ($Y_{ps}$).

Lastly, at step 204b6, the weights of the smoke parameter generation model 302 are updated at each predefined consecutive synthesis iso training iteration, based on the smoke parameter generation objective function ($L_{spg}$), until all the predefined consecutive synthesis training iterations are completed.

The trained smoky video frame generation model may be validated using a relevant validation dataset to check an accuracy of the model after the training and to get the optimal weights.

The trained smoky video frame generation model then used to obtain the smoky video for each smoke-free video, and the binary smoke segmentation map associated with each smoky video Firstly, each smoke-free video frame out of the predefined number of smoke-free video frames present in each smoke-free clip of the plurality of smoke-free clips present in each smoke-free video, is passed at a time, to the trained smoky video frame generation model. The smoke parameter generation model 302 generates the set of source aware smoke synthesis parameters for each smoke-free video frame. The smoke synthesis model 304 then generates the synthesized smoky video frame for each smoke-free video frame and the binary smoke segmentation mask associated with the synthesized smoky video frame, based on the set of source aware smoke synthesis parameters corresponding to each smoke-free video frame.

Next, the synthesized smoky video frame for each smoke-free frame out of the predefined number of smoke-free video frames present in each smoke-free dip of the plurality of smoke-free dips present in each smoke-free video, are combined, to obtain the smoky video for each smoke-free video. Similarly, the binary smoke segmentation mask associated with the synthesized smoky video frame obtained for each smoke-free video frame out of the predefined number of smoke-free video frames present in each smoke-free video dip of the plurality of smoke-free video dips present in each smoke-free video, are combined, to obtain the binary smoke segmentation map associated with each smoky video.

Figure 6:
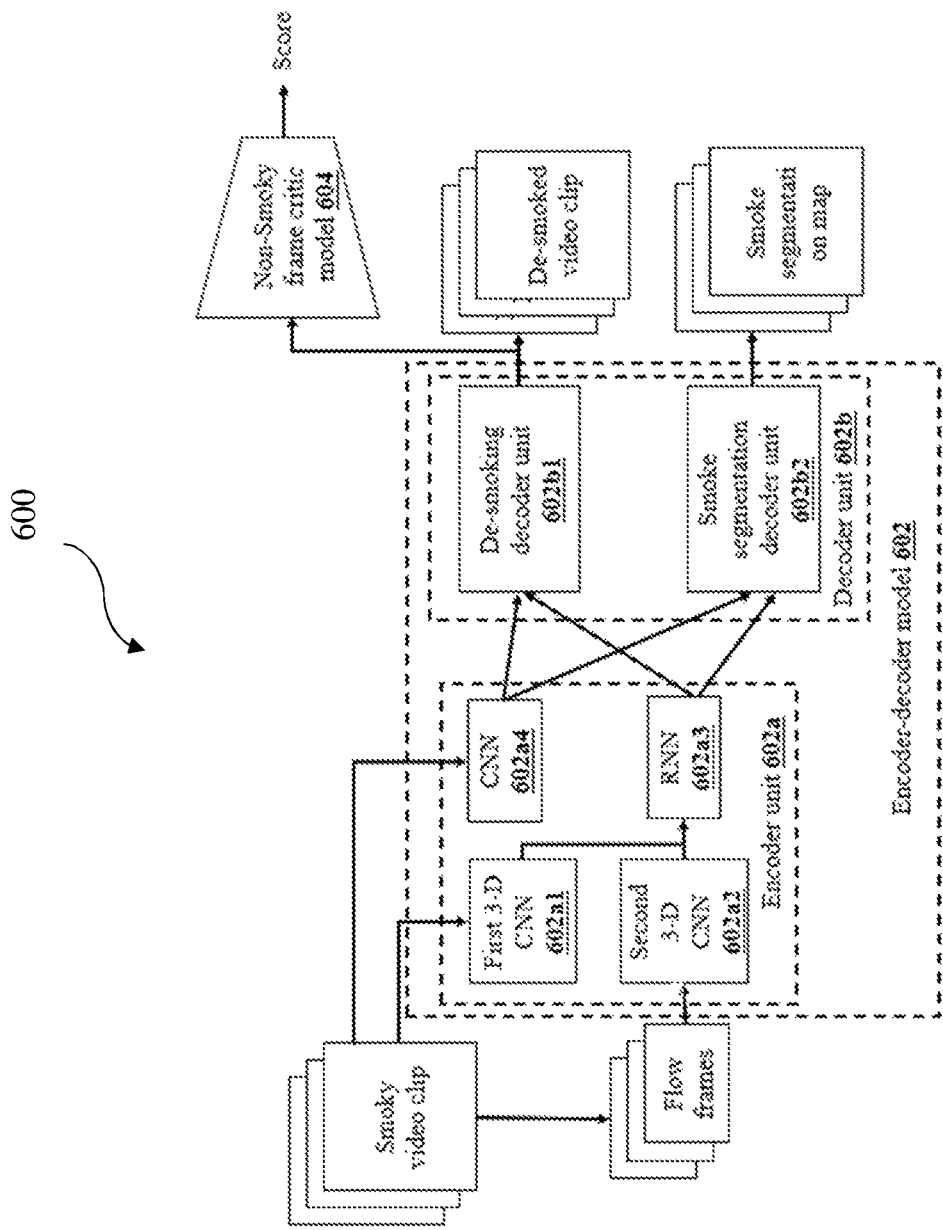
FIG. 6 is an exemplary architecture of a de-smoking model, in accordance with some embodiments of the present disclosure.

FIG. 6 is an exemplary architecture of a de-smoking model 600 in accordance with some embodiments of the present disclosure. As shown in FIG. 6, the de-smoking model 600 includes an encoder-decoder model 602 and a non-smoky frame critic model 604. The encoder-decoder model 602 includes an encoder unit 602a and a decoder unit 602b. The encoder unit 602a further includes a first 3-dimensional (3-D) convolutional network (first 3-D CNN) 602a1 and a second 3-D CNN 602a2, a recurrent neural network (RNN) 602a3 and a convolutional neural network (CNN) 602a4. The decoder unit 602b further includes a de-smoking decoder unit 602b1 and a smoke segmentation decoder unit 602b2.

In an embodiment, the first 3-D CNN 602a1 and the second 3-D CNN 602a2, may be I3D networks. In an embodiment, the CNN 602a4 may be a ResNet50. The RNN 602a3 includes a plurality of recurrent neural network layers. The de-smoking decoder unit 602b1 includes a set of first convolutional network pairs followed by first CNN layers. Each first convolutional network pair includes a 2-dimensional (2-D) transpose convolutional block followed by a 2-D convolutional block. In an embodiment, four such first convolutional network pairs may be present in the de-smoking decoder unit 602b1.

The smoke segmentation decoder unit 602b2 includes a set of second convolutional network pairs followed by second CNN layers. Each second convolutional network pair includes the 2-dimensional (2-D) transpose convolutional block followed by the 2-D convolutional block. In an embodiment, four such second convolutional network pairs may be present in the smoke segmentation decoder unit 602b2.

In an embodiment, the non-smoky frame critic model 604 is the CNN and is similar to the smoke frame critic model 306 (of FIG. 3). The non-smoky frame critic model 604 generates the learning signal required to train the encoder-decoder model 602 (particularly to train the de-smoking decoder unit 602b1). Further, the non-smoky frame critic model 604 distinguish smoke-free frames from that of de-smoked frames. The input feature size and the output feature size defined for each layer of the non-smoky frame critic model 604 are same as that of the input feature size and the output feature size defined for each layer of the smoke frame critic model 306, and as mentioned in table 2.

At step 206 of the method 200, the one or more hardware processors 104 of the system 100 are configured to train alternatively, (i) the encoder-decoder model 602, and (ii) the non-smoky frame critic model 604 present in the de-smoking model 600, for a predefined consecutive training iterations, with (i) the plurality of smoke-free videos and (ii) the plurality of smoky videos along with the binary smoke segmentation maps for the plurality of smoke-free videos, until a predefined total training iterations are completed, to generate a trained de-smoking model.

The predefined consecutive training iterations is always less than predefined total training iterations, and the predefined consecutive training iterations is completely divisible by the predefined total training iterations. For example, if the predefined consecutive training iterations is '5' and the predefined total training iterations is '100', then the encoder-decoder model 602 is trained consecutively for first 5 iterations with (i) the plurality of smoke-free videos and (ii) the plurality of smoky videos along with the binary smoke segmentation maps for the plurality of smoke-free videos. Next, the non-smoky frame critic model 604 is trained consecutively for next 5 iterations with (i) the plurality of smoke-free videos and (ii) the plurality of smoky videos along with the binary smoke segmentation maps for the plurality of smoke-free videos, and so on, until the 100 iterations are completed to obtain the trained de-smoking model.

Before the training process, weight of the networks present in the encoder-decoder model 602, and the non-smoky frame critic model 604 are initialized randomly. Then, the encoder-decoder model 602 is trained first for the predefined consecutive training iterations. Training the encoder-decoder model 603, for each of the predefined consecutive training iterations, comprises simultaneously training the encoder unit 602a and the decoder unit 602b present in the encoder-decoder model 603.

FIG. 7A and FIG. 7B illustrate exemplary flow diagrams for training an encoder-decoder model for each of the predefined consecutive training iterations, in accordance with some embodiments of the present disclosure. As shown in FIG. 7A and FIG. 7B, at step 206a1, one or more smoky video clips out of the plurality of smoky video clips present in each smoky video of the plurality of smoky videos, are formed as a first mini batch. The number of the one or more smoky video clips present in the first mini batch is defined by the predefined mini batch size. In an embodiment, the predefined mini batch size may be '10'. The one or more smoky video clips present in the first mini batch need not be same for each of the predefined consecutive training iterations.

At step 206a2, the one or more smoky video clips present in the first mini batch, formed at step 206a1, are passed to the encoder unit 602a, to extract (i) frame-level spatial features and (ii) long-term spatia-temporal features, for each smoky video clip of the one or more smoky video clips. The frame-level spatial features for each smoky video clip, are extracted by using the CNN 602a4 present in the encoder unit 602a. The frame-level spatial features for each smoky video clip are fixed number of intermediate spatial features that are considered as skip connections during up-sampling operation.

Let X be an exemplary smoky video clip having T number of smoky video frames, and the exemplary smoky video clip X is denoted by $X=(x_1, x_2, x_3, \ldots, x_T)$, wherein $x_1, x_2, x_3, \ldots, x_T$ are the smoky video frames. If the CNN 602a4 is the ResNet50, then the output feature size of the frame-level spatial features $f_1, f_2, f_3$ for the exemplary smoky video clip, extracted from the respective defined layers conv1-block1, conv2-block1, and conv3-block1 layers of the ResNet50 may be represented as $$f_1 \in \mathbb{R}^{T \times \frac{H}{2} \times \frac{W}{2} \times 64},$$

$$f_2 \in \mathbb{R}^{T \times \frac{H}{4} \times \frac{W}{4} \times 256},$$

and $f_3 \in \mathbb{R}^{T \times \frac{H}{8} \times \frac{W}{8} \times 512}$.

The extraction of the long-term spatio-temporal features for each smoky video dip is explained in the below steps. Firstly, an optical flow information for each smoky video clip are obtained using a flow information extraction technique. In an embodiment, the flow information extraction technique may employ optical flow information extraction algorithm such as TV_L1 optical flow algorithm and Gunnar-Farneback optical flow algorithm. The optical flow information gives the information about direction and magnitude of motion of image pixels between every two consecutive frames present in each smoky video dip. Hence the optical flow information essentially captures the dynamic properties of smoke present in in each smoky video dip.

Next, each smoky video dip is passed to the first 3-D CNN 602a1 present in the encoder unit 602a of the encoder-decoder model 602, to obtain a short-term spatio-temporal features associated with RGB stream. The short-term spatio-temporal features associated with RGB stream are appearance dependent spatio-temporal features related to color information captured from RGB appearance domain. The output feature size of the short-term spatio-temporal features ($u_1$) associated with RGB stream may be represented as $$u_1 \in \mathbb{R}^{\frac{T}{2} \times \frac{H}{8} \times \frac{W}{8} \times 480}.$$

Further, the optical flow information for each smoky video clip are passed to the second 3-D CNN 602a2 present in the encoder unit 602a of the encoder-decoder model 602, to obtain the short-term spatia-temporal features associated with motion stream. The short-term spatia-temporal features associated with motion stream are captured from motion domain and are appearance agnostic spatia-temporal features. Thus, the short-term spatio-temporal features associated with motion stream are invariant to the appearance and captures the spatia-temporal information of pixel motions. The output feature size of the short-term spatio-temporal features ($u_2$) associated with motion stream may be represented as $$u_2 \in \mathbb{R}^{\frac{T}{2} \times \frac{H}{8} \times \frac{W}{8} \times 480}.$$

Next, the short-term spatia-temporal features associated with RGB stream and the short-term spatia-temporal features associated with motion stream, for each smoky video dip, are concatenated to obtain a concatenated short-term spatio-temporal features for each smoky video dip. The concatenated short-term spatia-temporal features for each smoky video dip are the overall short-term spatia-temporal features corresponding to the smoky video dip. Lastly, the concatenated short-term spatio-temporal features for each smoky video dip are then passed, to the RNN 602a3 present in the encoder unit 602a of the encoder-decoder model 602, to obtain the long-term spatio-temporal features for each smoky video dip. The long-term spatio-temporal features for each smoky video dip are the concatenated short-term spatio-temporal features that are captured for a longer duration. In an embodiment, the RNN 602a3 may be a long short-term memory (LSTM) based network having a series of convolutional LSTM layers (the plurality of RNN layers in general) to capture the term spatio-temporal features for the longer duration. The output feature size of the long-term spatio-temporal features ($v$) for each smoky video clip may be represented as $$v \in \mathbb{R}^{\frac{T}{2} \times \frac{H}{8} \times \frac{W}{8} \times 64}.$$

At step 206a3, the frame-level spatial features and the long-term spatio-temporal features, for each smoky video clip of the one or more smoky video clips, obtained at step 206a2, are passed to both the de-smoking decoder unit 602b1 and the smoke segmentation decoder unit 602b2. The de-smoking decoder unit 602b1 is configured to output a predicted de-smoked video clip for each smoky video clip. The predicted de-smoked video clip for each smoky video clip is the smoke-free video clip after the smoke removal. The smoke segmentation decoder unit 602b2 is configured to output a predicted smoke segmentation map for each smoky video clip. The predicted smoke segmentation map for each smoky video clip is the binary smoke segmentation map which includes a binary smoke segmentation mask for each smoky video frame present in the smoky video clip.

Before passing the frame-level spatial features and the long-term spatio-temporal features to both the de-smoking decoder unit 602b1 and the smoke segmentation decoder unit 602b2, a temporal squeezing may be employed to minimize a computation, and a time lag that may exists between consecutive smoky video clips. A bottleneck layer may be introduced to employ the temporal squeezing that achieves compression along the time axis. The temporal squeezing may be achieved in multiple ways: (i) by taking a reduce mean along the time axis, or (ii) by using 1×1×1 convolution layers. The frame-level spatial features $f_1$, $f_2$, $f_3$, and the long-term spatio-temporal features v, after the temporal squeezing may be denoted as $\hat{f}_1$, $\hat{f}_2$, $\hat{f}_3$, $\hat{v}$, respectively. If the temporal squeezing is achieved by using the reduce mean along the time axis, then the output feature size of $\hat{f}_1$, $\hat{f}_2$, $\hat{f}_3$, $\hat{v}$ may be denoted as $$\hat{f}_1 \in \mathbb{R}^{1 \times \frac{H}{2} \times \frac{W}{2} \times 64}, \hat{f}_2 \in \mathbb{R}^{1 \times \frac{H}{4} \times \frac{W}{4} \times 256},$$

$$\hat{f}_3 \in \mathbb{R}^{1 \times \frac{H}{8} \times \frac{W}{8} \times 512}, \text{ and } \hat{v} \in \mathbb{R}^{1 \times \frac{H}{8} \times \frac{W}{8} \times 512}$$

respectively.

After the temporal squeezing, the long-term spatio-temporal features for each smoky video clip are passed as an input to the de-smoking decoder unit 602b1 and the smoke segmentation decoder unit 602b2. The layers present in the set of first convolutional network pairs of the de-smoking decoder unit 602b1 and the set of second convolutional network pairs of the smoke segmentation decoder unit 602b2, are responsible for the up-sampling operation. The frame-level spatial feature $\hat{f}_1$, $\hat{f}_2$, $\hat{f}_3$ for each smoky video clip are concatenated with the output of the intermediate layers of the de-smoking decoder unit 602b1 and the smoke segmentation decoder unit 602b2 via skip connections.

At step 206a4, the predicted de-smoked video clip for each smoky video clip, obtained at step 206a3, is passed to the non-smoky frame critic model 604, to obtain a predicted de-smoking confidence score for each smoky video clip. The predicted de-smoking confidence score for each smoky video clip, may be in the range 0 to 1, where '1' represents the absence of the smoke in the video frame and '0' represents the presence of the smoke in the video frame.

At step 206a5, a total objective function of the encoder-decoder model 602 is optimized. The total objective function includes a de-smoking objective function, a segmentation objective function and a non-smoky critic objective function. The de-smoking objective function which calculates an error between (i) the predicted de-smoked video clip corresponding to each smoky video clip and (ii) the smoke-free video clip corresponding to each smoky video clip. The segmentation objective function which calculates the error between (i) the predicted smoke segmentation map corresponding to each smoky video clip and (ii) the binary smoke segmentation mask for each smoky video frame of the predefined number of smoky video frames corresponding to each smoky video clip. The non-smoky critic objective function which calculates the error between (i) the predicted de-smoking confidence score for each smoky video clip, and (ii) a predefined de-smoking confidence score.

The total objective function ($L_t$) of the encoder-decoder model 602 may be mathematically represented in the below equation 3:

$$L_t = L_d + a_1 L_s + a_2 L_c \qquad (3)$$

wherein $L_d$ is the de-smoking objective function, $L_s$ is the segmentation objective function, $L_c$ is the non-smoky critic objective function, $\alpha_1$ is a predefined segmentation loss scale factor, $\alpha_2$ is a predefined non-smoky critic loss scaling factor. In an embodiment, $\alpha_1$ and $\alpha_2$ are positive numbers and may be $\alpha_1=\alpha_2=0.5$.

The de-smoking objective function ($L_d$) is one of: (i) a mean absolute error (MAE) based de-smoking objective function and (ii) a mean square error (MSE) based de-smoking objective function, decided for each of the predefined consecutive training iterations, based a convergence criteria defined by an adaptive loss scheduling algorithm. The adaptive loss scheduling algorithm switches the de-smoking objective function ($L_d$) between the mean absolute error (MAE) based de-smoking objective function and the mean square error (MSE) based de-smoking objective function, based a convergence criteria, at each of the predefined consecutive training iterations. In an embodiment, the adaptive loss scheduling algorithm initializes the de-smoking objective function ($L_d$) as the mean square error (MSE) based de-smoking objective function in the first predefined consecutive training iteration. Then, the adaptive loss scheduling algorithm switches the de-smoking objective function ($L_d$) as the mean absolute error (MAE) based de-smoking objective function when the convergence criteria is satisfied, for the subsequent predefined consecutive training iteration. The convergence criteria is defined based on (i) a multi-scale structural similarity metric (MSSSIM) calculated between each de-smoked video clip and the corresponding smoke-free video clip, and (ii) a mean variable defined based on the multi-scale structural similarity metric (MSSSIM). Mathematically, the mean absolute error (MAE) based de-smoking objective function and the mean square error (MSE) based de-smoking objective function are represented as in equation 4 and equation 5 respectively:

$$MAE \text{ based } de\text{-smoking objective function} = MAE(f_{ds}, f_{sf}) \qquad (4)$$

$$MSE \text{ based } de\text{-smoking objective function} = MSE(f_{ds}, f_{sf}) \qquad (5)$$

wherein, $f_{ds}$ is the predicted de-smoked video clip corresponding to each smoky video clip, and $f_{sf}$ is the smoke-free video clip corresponding to each smoky video clip.

The segmentation objective function ($L_s$) may be mathematically represented as in equation 6:

$$L_s = BCE(m_p, m) \qquad (6)$$

wherein BCE is the binary cross entropy, $m_p$, is the predicted smoke segmentation map corresponding to each smoky video clip, and is the binary smoke segmentation map obtained from the binary smoke segmentation mask for each smoky video frame of the predefined number of smoky video frames corresponding to each smoky video clip.

The non-smoky critic objective function may be mathematically represented as in equation 7:

$$L_s = BCE(S_{ds}, (1 - Y_{ds})) \qquad (7)$$

wherein BCE is the binary cross entropy, $S_{ds}$, is the predicted de-smoking confidence score for each smoky video clip, and $Y_{ds}$ is the predefined de-smoking confidence score.

At step 206a6, the weights of the encoder unit 602a and the decoder unit 602b (encoder-decoder model 602), are updated, based on the total objective function ($L_t$), for each of the predefined consecutive training iterations, until the predefined total training iterations are completed.

Figure 8B:
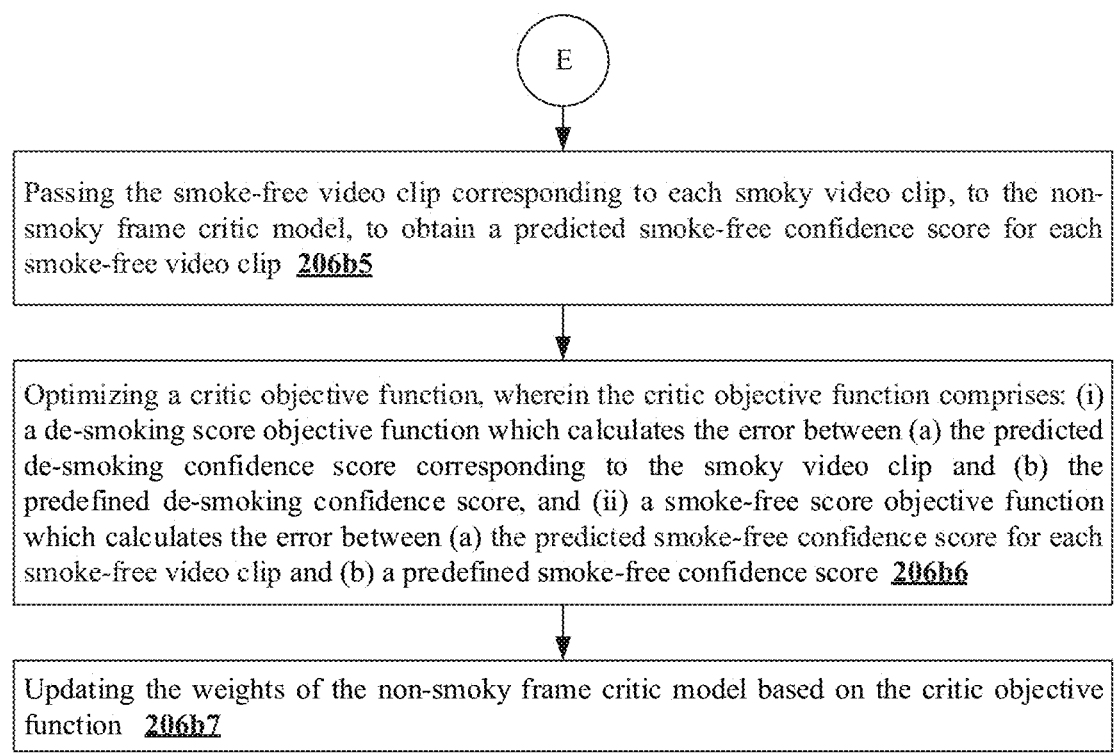

Similarly, the non-smoky frame critic model 604 is trained for each of the predefined consecutive training iterations. FIG. 8A and FIG. 8B illustrate exemplary flow diagrams for training the non-smoky frame critic model 604 for each of the predefined consecutive training iterations, in accordance with some embodiments of the present disclosure. As shown in FIG. 8A and FIG. 8B, at step 206b1, the one or more smoky video clips out of the plurality of smoky video clips present in each smoky video of the plurality of smoky videos, are formed as a second mini batch. The number of the one or more smoky video clips present in second mini batch is defined by the predefined mini batch size. In an embodiment, the predefined mini batch size may be '10'. The one or more smoky video clips present in the second mini batch need not be same for each of the predefined consecutive training iterations.

At step 206b2, the one or more smoky video clips present in the second mini batch, are passed to the encoder unit 602a, to extract the frame-level spatial features and the long-term spatiotemporal features, for each smoky video clip of the one or more smoky video clips present in the second mini batch formed at step 206b1, in the similar manner described at step 206a2.

At step 206b3, the frame-level spatial features and the long-term spatio-temporal features, for each smoky video clip of the one or more smoky video clips, obtained at step 206b2, are passed to both the de-smoking decoder unit 602b1 and the smoke segmentation decoder unit 602b2. The de-smoking decoder unit 602b1 is configured to output the predicted de-smoked video clip for each smoky video clip. The predicted de-smoked video clip for each smoky video clip is the smoke-free video clip after the smoke removal. The smoke segmentation decoder unit 602b2 is configured to output the predicted smoke segmentation map for each smoky video clip. The predicted smoke segmentation map for each smoky video clip is the binary smoke segmentation map which includes the binary smoke segmentation mask for each smoky video frame present in the smoky video clip.

At step 206b4, the predicted de-smoked video clip for each smoky video clip, obtained at step 206b3, is passed to the non-smoky frame critic model 604, to obtain a predicted de-smoking confidence score for each smoky video clip.

At step 206b5, the smoke-free video dip corresponding to each smoky video dip, is passed to the non-smoky frame critic model 604, to obtain a predicted smoke-free confidence score for each smoke-free video dip.

At step 206b6, a critic objective function of the non-smoky frame critic model 604 is optimized. The critic objective function includes a de-smoking score objective function and a smoke-free score objective function. The de-smoking score objective function calculates the error between (a) the predicted de-smoking confidence score corresponding to the smoky video dip and (b) the predefined de-smoking confidence score. The de-smoking score objective function ($L_{dso}$) may be mathematically represented as in equation 8:

$$L_{dso} = BCE(S_{ds}, Y_{ds}) \qquad (8)$$

wherein, BCE is the binary cross entropy, $S_{ds}$ is the predicted de-smoking confidence score for each smoky video dip, and $Y_{ds}$ is the predefined de-smoking confidence score.

The smoke-free score objective function calculates the error between (a) the predicted smoke-free confidence score for each smoke-free video dip and (b) a predefined smoke-free confidence score. The smoke-free score objective function ($L_{sfo}$) may be mathematically represented as in equation 8:

$$L_{sfo} = BCE(S_{sf}, Y_{sf}) \qquad (9)$$

wherein, BCE is the binary cross entropy, $S_{sf}$ is the predicted smoke-free confidence score for each smoke-free video clip, and $Y_{sf}$ is the predefined smoke-free confidence score.

At step 206b7, the weights of the non-smoky frame critic model 604 are updated, based on the critic objective function (206b7), for each of the predefined consecutive training iterations, until the predefined total training iterations are completed.

The trained de-smoking model may be validated using a validation dataset to check an accuracy of the model after the training and to get the optimal weights.

At step 208 of the method 200, the one or more hardware processors 104 of the system 100 are configured to receive an input smoky video for which the smoke to be removed. The input smoky video includes one or more input smoky video dips. Each input smoky video dip of the one or more input smoky video dips includes a predefined number of input smoky video frames.

In an embodiment the input smoky video may be a real-time video or an off-line video, based on an application. In case of the minimally invasive surgeries, the input smoky video may be the real-time video continuously receiving in the real-time as soon as the surgeon starts the surgery and the input smoky video may be stopped receiving once the surgery is completed. The one or more input smoky video clips may be received in a sequential order. Each input smoky video frame may be identified by the unique frame index. For example, the first input smoky video frame may have the frame index '1', the second input smoky video frame may have the frame index '2', and so on.

At step 210 of the method 200, the one or more hardware processors 104 of the system 100 are configured to pass each input smoky video clip, at a time, of the one or more input smoky video clips received at step 208 of the method 200, to the trained de-smoking model generated at step 206 of the method. The de-smoked video clip for each input smoky video clip of the one or more input smoky video clips, and the smoke segmentation map for each input smoky video clip of the one or more input smoky video clips, are obtained using the trained de-smoking model.

The encoder unit 602a extracts the frame-level spatial features and the long-term spatio-temporal features, for each input smoky video clip of the one or more input smoky video clips. The de-smoking decoder unit 602b1 generates the de-smoked video clip for each input smoky video clip of the one or more input smoky video clips, based on the frame-level spatial features and the long-term spatio-temporal features, corresponding to each input smoky video clip. The smoke segmentation decoder unit 602b2 generates the smoke segmentation map for each input smoky video clip of the one or more input smoky video clips, based on the frame-level spatial features and the long-term spatio-temporal features, corresponding to each input smoky video clip. The smoke segmentation map for each input smoky video clip, is useful for identifying the regions where the smoke is present in the input smoky video clip (in each smoky video frame) for further analysis.

At step 212 of the method 200, the one or more hardware processors 104 of the system 100 are configured to stitch the de-smoked video clip for each input smoky video clip of the one or more input smoky video clips, to obtain the de-smoked video for the input smoky video. The unique frame index may be used to stitch the one or more input smoky video clips, in the sequential order. The obtained de-smoked video is the smoke-free version of the input smoky video received at step 208 of the method 200.

It is apparent that the de-smoked video may be displayed on the display unit (not shown in FIG. 1) such as the monitor. For the minimally invasive surgery applications, surgeons can simultaneously visualize the de-smoked video in the real-time on the display unit and may perform the surgery without any interruption. Further, as the de-smoked video does not contain any smoke disturbances, the field view, the surgeons may complete the surgery more effectively and efficiently, within the critical time.

The methods and systems of the present disclosure generates the end-to-end de-smoking model (trained de-smoking model) which removes the smoke present in the video, without any human intervention. The present disclosure extracts dynamic properties of the smoke through the spatio-temporal features of the video clip using the encoder unit 602a, and hence the resultant de-smoked video is effective and accurate. Further, the present disclosure identifies only the regions affected with the smoke using the binary smoke segmentation mask (map) and simultaneously remove the smoke from the input smoky video clip. The present disclosure inherently compensates for any distortion that may happen during the process of de-smoking. Therefore, no post-processing is required for removing additional artifacts such as color compensation. The present disclosure utilizes the smoke synthesis approach through the trained smoky video frame generation model, which generates the synthesized smoky video for each smoke-free video, based on the set of source aware smoke synthesis parameters comprising the smoke source location, the smoke source shape, the velocity of the smoke, and the density of the smoke. Hence the video frames affected with the smoke may be in sync with corresponding smoke-free video frames. The smoke synthesized in the video frame may be dependent of the smoke synthesized in succeeding video frames, yielding the resultant training dataset used for generating the de-smoking model replicate a fluid nature of the smoke.

In the present disclosure, the synthesized smoky video frames are generated first using the trained smoky video frame generation model. Then, the de-smoking model is trained using the synthesized smoky video frames (video clips). However, it is apparent that if the synthesized smoky video frames are readily available, then the trained smoky video frame generation model is not required and hence the de-smoking model may be directly trained using the readily available synthesized smoky video frames.

The de-smoking model generated through the methods and systems of the present disclosure may be used for numerous applications where the smoke is to be removed. The applications include but are not limited to time critical minimally invasive surgeries such as laparoscopic surgeries, arthroscopic surgeries, and robotic surgeries, deep sea autonomous vehicle navigation, automated welding, firefighting devices, crane operation assistance at construction site, advanced driving assistance systems operating in scattering media, tracking and counting fish, coral reef monitoring, underwater 3-dimensional (3-D) reconstruction, and so on.

EXAMPLE SCENARIO

Cholec80 [A. P Twinanda, S. Shehata, D. Mutter, J. Marescaux, M De Mathelin, and Padoy. N, "Endonet: A deep architecture for recognition tasks on laparoscopic videos," IEEE Trans. Med. Imag, vol. 36, pp. 86-97, 2016.] data contains 80 videos with a resolution of 854×480 pixels of cholecystectomy surgeries is considered for generating the end-to-end de-smoking model by the system 100. Out of 80 videos, 40 smoke-free video clips are identified. The synthesized smoky video clips are obtained using the trained smoky video frame generation model, for each of the 40 smoke-free video clips.

The weights of the networks present in the de-smoking model 600 are randomly initialized and the de-smoking model 600 is trained for 200 epochs using an Adam optimizer with a learning rate of $1e^{-4}$. At each training iteration, the mini batch is constructed by randomly sampling 4 video clips with a frame length of 10. These frames are resized to a spatial resolution of 224×224, and further, the pixel values are normalized to [0,1] range. A TensorFlow framework is used for the implementation and the experiments are performed on a machine with NVIDIA Tesla v100 GPU.

Figure 9:
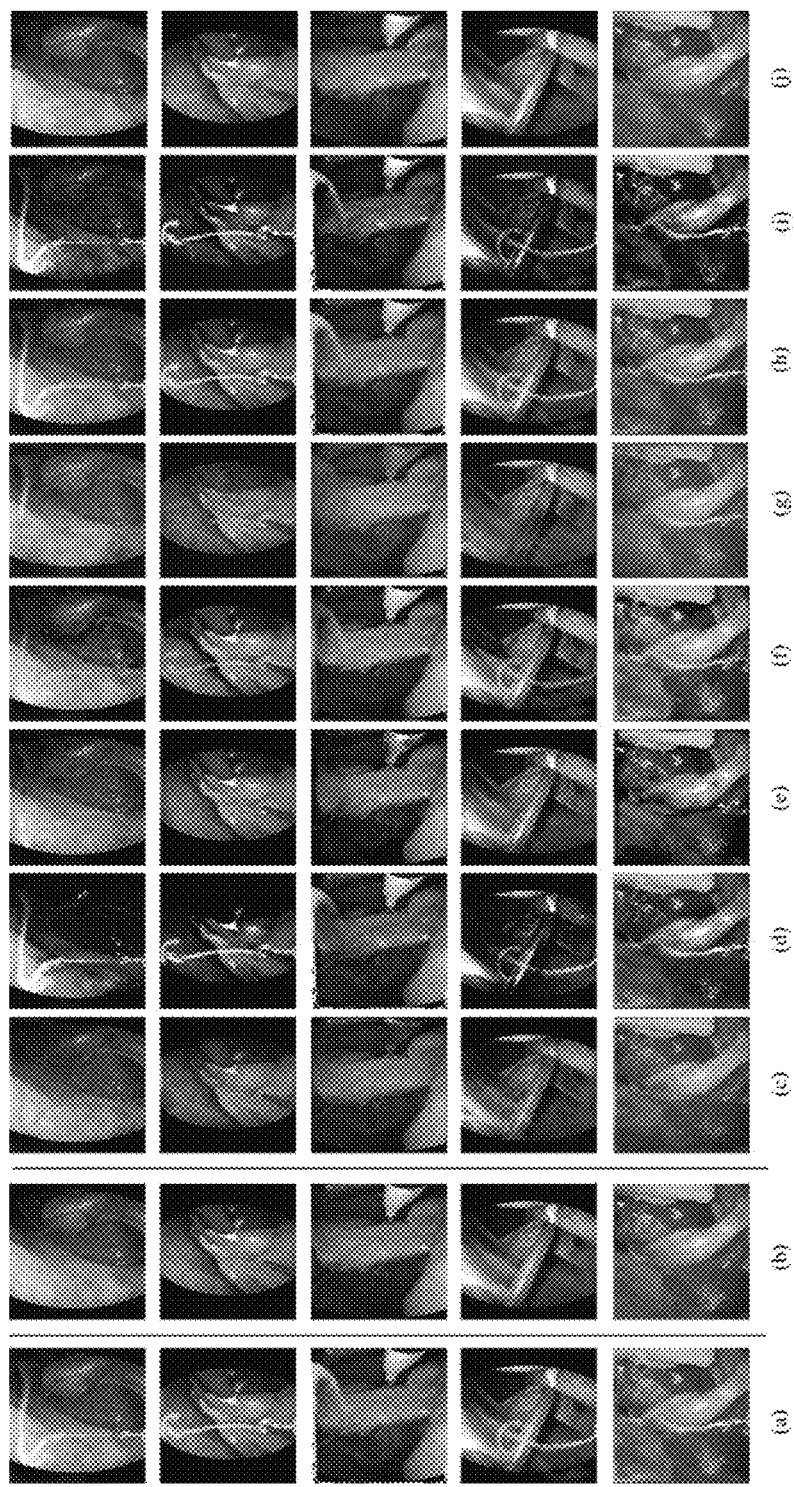
FIG. 9 shows a comparison of grey-scale version of the de-smoked video frames generated through the present disclosure and conventional approaches.

FIG. 9 shows a comparison of grey-scale version of the de-smoked video frames generated through the present disclosure and conventional approaches. As shown in FIG. 9, column (a) represents an input frame with smoke and column (b) represents a ground-truth smoke-free frame input frame with smoke. Column (c) is the de-smoked video frame obtained through the image to image translation guided by dark channel.

Column (d) is the de-smoked video frame obtained through the Image to image translation guided by dark channel(pre-trained). Column (e) is the de-smoked video frame obtained through the generative smoke. Column (f) is the de-smoked video frame obtained through the multiscale deep de-smoking.

Column (g) is the de-smoked video frame obtained through unsupervised learning of smoke removal. Column (h) is the de-smoked video frame obtained through all-in-one dehazing network. Column (i) is the de-smoked video frame obtained through surgical smoke dehazing and color reconstruction. Finally, Column (j) is the de-smoked video frame obtained using the end-to-end de-smoking model of the present disclosure. Based on the comparison shown in FIG. 9, it is evident that the de-smoked video frame obtained using the present disclosure is effective over the conventional de-smoking approaches. which contains some distortions. No visual distortions are present in the de-smoked video frame obtained using the present disclosure, while some visual distortions are present in the de-smoked video frame obtained through the conventional de-smoking approaches.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent dements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description; a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method comprising the steps of:
receiving, via one or more hardware processors, a plurality of smoke-free videos, wherein each smoke-free video of the plurality of smoke-free videos comprises a plurality of smoke-free video clips, wherein each smoke-free video clip of the plurality of smoke-free video clips comprises a predefined number of smoke-free video frames;
obtaining, via the one or more hardware processors, (i) a smoky video for each smoke-free video of the plurality of smoke-free videos, and (ii) a binary smoke segmentation map associated with each smoky video, using a trained smoky video frame generation model, to get a plurality of smoky videos along with binary smoke segmentation maps for the plurality of smoke-free videos, wherein the smoky video for each smoke-free video comprises a plurality of smoky video clips corresponding to the plurality of smoke-free video clips present in the smoke-free video, wherein each smoky video clip comprises a predefined number of synthesized smoky video frames corresponding to the predefined number of smoke-free video frames present in the smoke-free video clip, and the binary smoke segmentation map associated with each smoky video comprises a binary smoke segmentation mask for each synthesized smoky video frame of the predefined number of synthesized smoky video frames present in each smoky video clip; and
training alternatively, via the one or more hardware processors, (i) an encoder-decoder model present in a de-smoking model, the encoder-decoder model consists of an encoder unit and a decoder unit, wherein the decoder unit comprises a de-smoking decoder unit and a smoke segmentation decoder unit, and (ii) a non-smoky frame critic model present in the de-smoking model, for a predefined consecutive training iterations, with (i) the plurality of smoke-free videos and (ii) the plurality of smoky videos along with the binary smoke segmentation maps for the plurality of smoke-free videos, until a predefined total training iterations are completed, to generate a trained de-smoking model, wherein the trained de-smoking model is generated by:
(a) training the encoder-decoder model, for each of the predefined consecutive training iterations, comprises simultaneously training the encoder unit and the decoder unit present in the encoder-decoder model, by:
forming one or more smoky video clips out of the plurality of smoky video clips present in each smoky video of the plurality of smoky videos, as a first mini batch, based on a predefined mini batch size;
passing the one or ore smoky video clips present in the first mini batch, to the encoder unit, to extract (i) frame-level spatial features and (ii) long-term spatio-temporal features, for each smoky video clip of the one or more smoky video dips;
passing (i) the frame-level spatial features and (ii) the long-term spatio-temporal features, for each smoky video clip of the one or more smoky video clips, to the de-smoking decoder unit and the smoke segmentation decoder unit, to obtain a predicted de-smoked video clip for each smoky video clip and a predicted smoke segmentation map for each smoky video clip, respectively;

passing the predicted de-smoked video clip for each smoky video clip, to the non-smoky frame critic model, to obtain a predicted de-smoking confidence score for each smoky video clip;

optimizing a total objective function of the encoder-decoder model, wherein the total objective function comprises:

(a) a de-smoking objective function which calculates an error between (i) the predicted de-smoked video clip corresponding to each smoky video clip and (ii) the smoke-free video clip corresponding to each smoky video dip;

(b) a segmentation objective function which calculates the error between (i) the predicted smoke segmentation map corresponding to each smoky video clip and (ii) the binary smoke segmentation mask for each smoky video frame of the predefined number of smoky video frames corresponding to each smoky video dip; and (c) a non-smoky critic objective function which calculates the error between (i) the predicted de-smoking confidence score for each smoky video dip, and (ii) a predefined de-smoking confidence score; and updating weights of the encoder unit and the decoder unit, based on the total objective function; and (b) training the non-smoky frame critic model, for each of the predefined consecutive training iterations, comprises:

forming the one or more smoky video dips out of the plurality of smoky video dips present in each smoky video of the plurality of smoky videos, as a second mini batch, based on the predefined mini batch size;

passing the one or more smoky video dips present in the second mini batch, to the encoder unit, to extract (i) the frame-level spatial features and (ii) the long-term spatio-temporal features, for each smoky video dip of the one or more smoky video dips;

passing (i) the frame-level spatial features and (ii) the long-term spatio-temporal features, for each smoky video clip of the one or more smoky video dips, to the de-smoking decoder unit and the smoke segmentation decoder unit, to obtain the predicted de-smoked video dip for each smoky video clip and the predicted smoke segmentation map for each smoky video dip, respectively;

passing the predicted de-smoked video dip for each smoky video dip, to the non-smoky frame critic model, to obtain the predicted de-smoking confidence score for each smoky video dip;

passing the smoke-free video dip corresponding to each smoky video dip, to the non-smoky frame critic model, to obtain a predicted smoke-free confidence score for each smoke-free video clip;

optimizing a critic objective function, wherein the critic objective function comprises: (i) a de-smoking score objective function which calculates the error between (a) the predicted de-smoking confidence score corresponding to the smoky video clip and (b) the predefined de-smoking confidence score, and (ii) a smoke-free score objective function which calculates the error between (a) the predicted smoke-free confidence score for each smoke-free video dip and (b) a predefined smoke-free confidence score; and updating weights of the non-smoky frame critic model based on the critic objective function.

2. The method of claim 1, further comprising:

receiving, via the one or more hardware processors, an input smoky video for which smoke to be removed, wherein the input smoky video comprises one or more input smoky video dips, wherein each input smoky video dip of the one or more input smoky video dips comprises a predefined number of input smoky video frames;

passing, via one or more hardware processors, each input smoky video clip, at a time, of the one or more input smoky video dips, to the trained de-smoking model, to obtain (i) the de-smoked video clip for each input smoky video clip of the one or more input smoky video clips, and (ii) a smoke segmentation map for each input smoky video clip of the one or more input smoky video clips; and stitching, via one or more hardware processors, the de-smoked video clip for each input smoky video clip of the one or more input smoky video clips, to obtain the de-smoked video for the input smoky video.

3. The method of claim 1, wherein the trained smoky video frame generation model is obtained by:

receiving a natural smoky video frames dataset and a natural smoke-free video frames dataset, wherein the natural smoky video frames dataset comprises a plurality of natural smoky video frames and the natural smoke-free video frames dataset comprises a plurality of natural smoke-free video frames;

training alternatively, a smoke frame critic model and a smoke parameter generation model present in a smoky video frame generation model, for predefined consecutive synthesis training iterations, with (i) the natural smoky video frames dataset and (ii) the natural smoke-free video frames dataset, until predefined total synthesis training iterations are completed, wherein:

(a) training the smoke frame critic model for each of the predefined consecutive synthesis training iterations, comprises:

forming (i) one or more natural smoke-free video frames out of the plurality of natural smoke-free video frames present in the natural smoke-free video frames dataset, as a third mini batch, and (ii) one or more natural smoky video frames out of the plurality of natural smoky video frames present in the natural smoky video frames dataset, as a fourth mini batch, based on the predefined mini batch size;

generating a set of source aware smoke synthesis parameters, for each natural smoke-free video frame of the one or more natural smoke-free video frames present in the third mini batch, using a current state of the smoke parameter generation model;

generating a synthesized smoky video frame for each natural smoke-free video frame of the one or more natural smoke-free video frames present in the third mini batch, using a smoke synthesis model present in the smoky video frame generation model, based on the set of source aware smoke synthesis parameters corresponding to each natural smoke-free video frame, to obtain one or more synthesized smoky video frames for the one or more natural smoke-free video frames;

passing the one or more natural smoky video frames present in the fourth mini batch, to the smoke frame critic model, to obtain a natural smoky video frame confidence score for each natural smoky video frame of the one or more natural smoky video frames;

passing the one or more synthesized smoky video frames, to the smoke frame critic model, to obtain a predicted smoky video frame confidence score for each synthesized smoky video frame of the one or more synthesized smoky video frames;

optimizing a smoke frame critic objective function comprising a natural score objective function and a synthetic score objective function, wherein the natural score objective function calculates an error between the natural smoky video frame confidence score for each natural smoky video frame and a predefined natural smoky video frame confidence score, and the synthetic score objective function calculates the error between the predicted smoky video frame confidence score for each synthesized smoky video frame and a predefined predicted smoky video frame confidence score; and updating weights of the smoke frame critic model, based on the smoke frame critic objective function; and (b) training the smoke parameter generation model for each of the predefined consecutive synthesis training iterations, comprises:

forming one or more natural smoke-free video frames out of the plurality of natural smoke-free video frames present in the natural smoke-free video frames dataset, as a fifth mini batch, based on the predefined mini batch size;

generating the set of source aware smoke synthesis parameters, for each natural smoke-free video frame of the one or more natural smoke-free video frames present in the fifth mini batch, using the current state of the smoke parameter generation model;

generating the synthesized smoky video frame for each natural smoke-free video frame of the one or more natural smoke-free video frames present in the fifth mini batch, using the smoke synthesis model present in the smoky video frame generation model; based on the set of source aware smoke synthesis parameters corresponding to each natural smoke-free video frame, to obtain the one or more synthesized smoky video frames for the one or more natural smoke-free video frames;

passing the one or more synthesized smoky video frames, to the smoke frame critic model; to obtain the predicted smoky video frame confidence score for each synthesized smoky video frame of the one or more predicted smoky video frames;

optimizing a smoke parameter generation objective function which calculates the error between the predicted smoky video frame confidence score for each synthesized smoky video frame and the predefined predicted smoky video frame confidence score; and updating weights of the smoke parameter generation model, based on the smoke parameter generation objective function.

4. The method of claim 3, wherein the set of source aware smoke synthesis parameters comprises: (i) a smoke source location, (ii) a smoke source shape, (iii) a velocity of smoke, and (iv) a density of the smoke.

5. The method of claim 3, wherein the smoke frame critic model and the smoke parameter generation model are convolutional neural networks.

6. The method of claim 1, wherein obtaining (i) the smoky video for each smoke-free video of the plurality of smoke-free videos, and (ii) the binary smoke segmentation map associated with each smoky video, using the trained smoky video frame generation model, further comprises:

passing each smoke-free video frame at a time, out of the predefined number of smoke-free video frames present in each smoke-free clip of the plurality of smoke-free clips present in each smoke-free video, to the trained smoky video frame generation model, to generate (i) the synthesized smoky video frame for each smoke-free video frame and (ii) the binary smoke segmentation mask associated with the synthesized smoky video frame; and combining (i) the synthesized smoky video frame for each smoke-free frame out of the predefined number of smoke-free video frames present in each smoke-free clip of the plurality of smoke-free clips present in each smoke-free video, to obtain the smoky video for each smoke-free video, and (ii) the binary smoke segmentation mask associated with the synthesized smoky video frame obtained for each smoke-free video frame out of the predefined number of smoke-free video frames present in each smoke-free video clip of the plurality of smoke-free video clips present in each smoke-free video, to obtain the binary smoke segmentation map associated with each smoky video.

7. The method of claim 1, wherein the frame-level spatial features for each smoky video clip, are extracted by using a convolutional neural network (CNN) present in the encoder unit of the encoder-decoder model.

8. The method of claim 1, wherein the long-term spatio-temporal features for each smoky video dip, are extracted by:

obtaining an optical flow information for each smoky video clip, using a flow information extraction technique;

passing each smoky video clip to a first 3-dimensional (3-D) convolutional neural network present in the encoder unit of the encoder-decoder model, to obtain a short-term spatio-temporal features associated with RGB stream;

passing the optical flow information for each smoky video clip to a second 3-D CNN present in the encoder unit of the encoder-decoder model, to obtain the short-term spatio-temporal features associated with motion stream;

concatenating (i) the short-term spatio-temporal features associated with RGB stream and (ii) the short-term spatio-temporal features associated with motion stream, to obtain a concatenated short-term spatio-temporal features for each smoky video clip, and passing the concatenated short-term spatio-temporal features for each smoky video clip, to a recurrent neural network (RNN) present in the encoder unit of the encoder-decoder model, to obtain the long-term spatio-temporal features for each smoky video dip.

9. The method of claim 1, wherein:

(i) the de-smoking decoder unit present in the decoder unit of the encoder-decoder model, comprises a set of first convolutional network pairs, wherein each first convolutional network pair comprises a 2-dimensional (2-D) transpose convolutional block followed by a 2-D convolutional block; and (ii) the smoke segmentation decoder unit present in the decoder unit of the encoder-decoder model, comprises a set of second convolutional network pairs, wherein each second convolutional network pair comprises the 2-dimensional (2-D) transpose convolutional block followed by the 2-D convolutional block.

10. A system comprising:
a memory storing instructions;
one or more Input/Output (I/O) interfaces; and
one or more hardware processors coupled to the memory via the one or more I/O interfaces,
wherein the one or more hardware processors are configured by the instructions to:
receive a plurality of smoke-free videos, wherein each smoke-free video of the plurality of smoke-free videos comprises a plurality of smoke-free video dips, wherein each smoke-free video clip of the plurality of smoke-free video dips comprises a predefined number of smoke-free video frames;
obtain (i) a smoky video for each smoke-free video of the plurality of smoke-free videos, and (ii) a binary smoke segmentation map associated with each smoky video, using a trained smoky video frame generation model, to get a plurality of smoky videos along with binary smoke segmentation maps for the plurality of smoke-free videos, wherein the smoky video for each smoke-free video comprises a plurality of smoky video dips corresponding to the plurality of smoke-free video dips present in the smoke-free video, wherein each smoky video dip comprises a predefined number of synthesized smoky video frames corresponding to the predefined number of smoke-free video frames present in the smoke-free video clip, and the binary smoke segmentation map associated with each smoky video comprises a binary smoke segmentation mask for each synthesized smoky video frame of the predefined number of synthesized smoky video frames present in each smoky video clip; and
train alternatively, (i) an encoder-decoder model present in a de-smoking model, the encoder-decoder model consists of an encoder unit and a decoder unit, wherein the decoder unit comprises a de-smoking decoder unit and a smoke segmentation decoder unit, and (ii) a non-smoky frame critic model present in the de-smoking model, for a predefined consecutive training iterations, with (i) the plurality of smoke-free videos and (ii) the plurality of smoky videos along with the binary smoke segmentation maps for the plurality of smoke-free videos, until a predefined total training iterations are completed, to generate a trained de-smoking model, wherein the trained de-smoking model is generated by:
(a) training the encoder-decoder model, for each of the predefined consecutive training iterations, comprises simultaneously training the encoder unit and the decoder unit present in the encoder-decoder model, by:
forming one or more smoky video cups out of the plurality of smoky video clips present in each smoky video of the plurality of smoky videos, as a first mini batch, based on a predefined mini batch size;
passing the one or more smoky video clips present in the first mini batch, to the encoder unit, to extract (i) frame-level spatial features and (ii) long-term spatio-temporal features, for each smoky video clip of the one or more smoky video clips;
passing (i) the frame-level spatial features and (ii) the long-term spatio-temporal features, for each smoky video clip of the one or more smoky video clips, to the de-smoking decoder unit and the smoke segmentation decoder unit, to obtain a predicted de-smoked video clip for each smoky video clip and a predicted smoke segmentation map for each smoky video clip, respectively;
passing the predicted de-smoked video clip for each smoky video clip, to the non-smoky frame critic model, to obtain a predicted de-smoking confidence score for each smoky video clip,
optimizing a total objective function of the encoder-decoder model, wherein the total objective function comprises:
(a) a de-smoking objective function which calculates an error between (i) the predicted de-smoked video clip corresponding to each smoky video clip and (ii) the smoke-free video clip corresponding to each smoky video clip;
(b) a segmentation objective function which calculates the error between (i) the predicted smoke segmentation map corresponding to each smoky video dip and (ii) the binary smoke segmentation mask for each smoky video frame of the predefined number of smoky video frames corresponding to each smoky video clip; and
(c) a non-smoky critic objective function which calculates the error between (i) the predicted de-smoking confidence score for each smoky video clip, and (ii) a predefined de-smoking confidence score; and
updating weights of the encoder unit and the decoder unit, based on the total objective function; and
(b) training the non-smoky frame critic model, for each of the predefined consecutive training iterations, comprises:
forming the one or more smoky video clips out of the plurality of smoky video clips present in each smoky video of the plurality of smoky videos, as a second mini batch, based on the predefined mini batch size;
passing the one or more smoky video clips present in the second mini batch, to the encoder unit, to extract (i) the frame-level spatial features and (ii) the long-term spatio-temporal features, for each smoky video clip of the one or more smoky video clips;
passing (i) the frame-level spatial features and (ii) the long-term spatio-temporal features, for each smoky video clip of the one or more smoky video clips, to the de-smoking decoder unit and the smoke segmentation decoder unit, to obtain the predicted de-smoked video clip for each smoky video clip and the predicted smoke segmentation map for each smoky video clip, respectively;

passing the predicted de-smoked video clip for each smoky video clip, to the non-smoky frame critic model, to obtain the predicted de-smoking confidence score for each smoky video clip;

passing the smoke-free video clip corresponding to each smoky video clip, to the non-smoky frame critic model, to obtain a predicted smoke-free confidence score for each smoke-free video clip;

optimizing a critic objective function, wherein the critic objective function comprises: (i) a de-smoking score objective function which calculates the error between (a) the predicted de-smoking confidence score corresponding to the smoky video clip and (b) the predefined de-smoking confidence score, and (ii) a smoke-free score objective function which calculates the error between (a) the predicted smoke-free confidence score for each smoke-free video clip and (b) a predefined smoke-free confidence score; and updating weights of the non-smoky frame critic model based on the critic objective function.

11. The system of claim 10, wherein the one or more hardware processors are further configured to:

receive an input smoky video for which smoke to be removed, wherein the input smoky video comprises one or more input smoky video clips, wherein each input smoky video clip of the one or more input smoky video clips comprises a predefined number of input smoky video frames;

pass each input smoky video clip, at a time, of the one or more input smoky video clips, to the trained de-smoking model, to obtain (i) the de-smoked video clip for each input smoky video clip of the one or more input smoky video clips, and (ii) a smoke segmentation map for each input smoky video clip of the one or more input smoky video clips; and stitch the de-smoked video clip for each input smoky video clip of the one or more input smoky video clips, to obtain the de-smoked video for the input smoky video.

12. The system of claim 10, wherein the one or more hardware processors are configured to obtain the trained smoky video frame generation model, by:

receiving a natural smoky video frames dataset and a natural smoke-free video frames dataset, wherein the natural smoky video frames dataset comprises a plurality of natural smoky video frames and the natural smoke-free video frames dataset comprises a plurality of natural smoke-free video frames;

training alternatively, a smoke frame critic model and a smoke parameter generation model present in a smoky video frame generation model, for predefined consecutive synthesis training iterations, with (i) the natural smoky video frames dataset and (ii) the natural smoke-free video frames dataset, until predefined total synthesis training iterations are completed, wherein:

(a) training the smoke frame critic model for each of the predefined consecutive synthesis training iterations, comprises:

forming (i) one or more natural smoke-free video frames out of the plurality of natural smoke-free video frames present in the natural smoke-free video frames dataset, as a third mini batch, and (ii) one or more natural smoky video frames out of the plurality of natural smoky video frames present in the natural smoky video frames dataset, as a fourth mini batch, based on the predefined mini batch size;

generating a set of source aware smoke synthesis parameters, for each natural smoke-free video frame of the one or more natural smoke-free video frames present in the third mini batch, using a current state of the smoke parameter generation model;

generating a synthesized smoky video frame for each natural smoke-free video frame of the one or more natural smoke-free video frames present in the third mini batch, using a smoke synthesis model present in the smoky video frame generation model, based on the set of source aware smoke synthesis parameters corresponding to each natural smoke-free video frame, to obtain one or more synthesized smoky video frames for the one or more natural smoke-free video frames;

passing the one or more natural smoky video frames present in the fourth mini batch, to the smoke frame critic model, to obtain a natural smoky video frame confidence score for each natural smoky video frame of the one or more natural smoky video frames;

passing the one or more synthesized smoky video frames, to the smoke frame critic model, to obtain a predicted smoky video frame confidence score for each synthesized smoky video frame of the one or more synthesized smoky video frames;

optimizing a smoke frame critic objective function comprising a natural score objective function and a synthetic score objective function, wherein the natural score objective function calculates an error between the natural smoky video frame confidence score for each natural smoky video frame and a predefined natural smoky video frame confidence score, and the synthetic score objective function calculates the error between the predicted smoky video frame confidence score for each synthesized smoky video frame and a predefined predicted smoky video frame confidence score; and updating weights of the smoke frame critic model, based on the smoke frame critic objective function; and (b) training the smoke parameter generation model for each of the predefined consecutive synthesis training iterations, comprises:

forming one or more natural smoke-free video frames out of the plurality of natural smoke-free video frames present in the natural smoke-free video frames dataset, as a fifth mini batch, based on the predefined mini batch size;

generating the set of source aware smoke synthesis parameters, for each natural smoke-free video frame of the one or more natural smoke-free video frames present in the fifth mini batch, using the current state of the smoke parameter generation model;

generating the synthesized smoky video frame for each natural smoke-free video frame of the one or more natural smoke-free video frames present in the fifth mini batch, using the smoke synthesis model present in the smoky video frame generation model, based on the set of source aware smoke synthesis parameters corresponding to each natural smoke-free video frame, to obtain the one or more synthesized smoky video frames for the one or more natural smoke-free video frames;

passing the one or more synthesized smoky video frames, to the smoke frame critic model, to obtain the predicted smoky video frame confidence score for each synthesized smoky video frame of the one or more predicted smoky video frames;

optimizing a smoke parameter generation objective function which calculates the error between the predicted smoky video frame confidence score for each synthesized smoky video frame and the predefined predicted smoky video frame confidence score; and updating weights of the smoke parameter generation model, based on the smoke parameter generation objective function.

13. The system of claim 12, wherein the set of source aware smoke synthesis parameters comprises: (i) a smoke source location, (ii) a smoke source shape, (iii) a velocity of smoke, and (iv) a density of the smoke.

14. The system of claim 12, wherein the smoke frame critic model and the smoke parameter generation model are convolutional neural networks.

15. The system of claim 10, wherein the one or more hardware processors are configured to obtain (i) the smoky video for each smoke-free video of the plurality of smoke-free videos, and (ii) the binary smoke segmentation map associated with each smoky video, using the trained smoky video frame generation model, by:

passing each smoke-free video frame at a time, out of the predefined number of smoke-free video frames present in each smoke-free clip of the plurality of smoke-free clips present in each smoke-free video, to the trained smoky video frame generation model, to generate (i) the synthesized smoky video frame for each smoke-free video frame and (ii) the binary smoke segmentation mask associated with the synthesized smoky video frame; and combining (i) the synthesized smoky video frame for each smoke-free frame out of the predefined number of smoke-free video frames present in each smoke-free clip of the plurality of smoke-free clips present in each smoke-free video, to obtain the smoky video for each smoke-free video, and (ii) the binary smoke segmentation mask associated with the synthesized smoky video frame obtained for each smoke-free video frame out of the predefined number of smoke-free video frames present in each smoke-free video clip of the plurality of smoke-free video clips present in each smoke-free video, to obtain the binary smoke segmentation map associated with each smoky video.

16. The system of claim 10, wherein the one or more hardware processors are configured to extract the frame-level spatial features for each smoky video clip, by using a convolutional neural network (CNN) present in the encoder unit of the encoder-decoder model.

17. The system of claim 10, wherein the one or more hardware processors are configured to extract the long-term spatio-temporal features for each smoky video clip, by:

obtaining an optical flow information for each smoky video clip, using a flow information extraction technique;

passing each smoky video clip to a first 3-dimensional (3-D) convolutional neural network (CNN) present in the encoder unit of the encoder-decoder model, to obtain a short-term spatio-temporal features associated with RGB stream;

passing the optical flow information for each smoky video clip to a second 3-D CNN present in the encoder unit of the encoder-decoder model, to obtain the short-term spatio-temporal features associated with motion stream;

concatenating (i) the short-term spatio-temporal features associated with RGB stream and (ii) the short-term spatio-temporal features associated with motion stream, to obtain a concatenated short-term spatio-temporal features for each smoky video clip; and passing the concatenated short-term spatio-temporal features for each smoky video dip, to a recurrent neural network (RNN) present in the encoder unit of the encoder-decoder model, to obtain the long-term spatio-temporal features for each smoky video dip.

18. The system of claim 10, wherein:
(i) the de-smoking decoder unit present in the decoder unit of the encoder-decoder model, comprises a set of first convolutional network pairs, wherein each first convolutional network pair comprises a 2-dimensional (2-D) transpose convolutional block followed by a 2-D convolutional block; and
(ii) the smoke segmentation decoder unit present in the decoder unit of the encoder-decoder model, comprises a set of second convolutional network pairs, wherein each second convolutional network pair comprises the 2-dimensional (2-D) transpose convolutional block followed by the 2-D convolutional block.

19. A computer program product comprising a non-transitory computer readable medium having a computer readable program embodied therein, wherein the computer readable program, when executed on a computing device, causes the computing device to;

receive a plurality of smoke-free videos, wherein each smoke-free video of the plurality of smoke-free videos comprises a plurality of smoke-free video dips, wherein each smoke-free video dip of the plurality of smoke-free video dips comprises a predefined number of smoke-free video frames;

obtain (i) a smoky video for each smoke-free video of the plurality of smoke-free videos, and (ii) a binary smoke segmentation map associated with each smoky video, using a trained smoky video frame generation model, to get a plurality of smoky videos along with binary smoke segmentation maps for the plurality of smoke-free videos, wherein the smoky video for each smoke-free video comprises a plurality of smoky video clips corresponding to the plurality of smoke-free video clips present in the smoke-free video, wherein each smoky video dip comprises a predefined number of synthesized smoky video frames corresponding to the predefined number of smoke-free video frames present in the smoke-free video clip, and the binary smoke segmentation map associated with each smoky video comprises a binary smoke segmentation mask for each synthesized smoky video frame of the predefined number of synthesized smoky video frames present in each smoky video clip;

train alternatively, (i) an encoder-decoder model present in a de-smoking model, the encoder-decoder model consists of an encoder unit and a decoder unit, wherein the decoder unit comprises a de-smoking decoder unit and a smoke segmentation decoder unit, and (ii) a non-smoky frame critic model present in the de-smoking model, for a predefined consecutive training iterations, with (i) the plurality of smoke-free videos and (ii) the plurality of smoky videos along with the binary smoke segmentation maps for the plurality of smoke-free videos, until a predefined total training iterations are completed, to generate a trained de-smoking model, wherein the trained de-smoking model is generated by:

(a) training the encoder-decoder model, for each of the predefined consecutive training iterations, comprises simultaneously training the encoder unit and the decoder unit present in the encoder-decoder model, by:

forming one or more smoky video clips out of the plurality of smoky video clips present in each smoky video of the plurality of smoky videos, as a first mini batch, based on a predefined mini batch size;

passing the one or more smoky video clips present in the first mini batch, to the encoder unit, to extract (i) frame-level spatial features and (ii) long-term spatio-temporal features, for each smoky video clip of the one or more smoky video clips;

passing (i) the frame-level spatial features and (ii) the long-term spatio-temporal features, for each smoky video clip of the one or more smoky video clips, to the de-smoking decoder unit and the smoke segmentation decoder unit, to obtain a predicted de-smoked video clip for each smoky video clip and a predicted smoke segmentation map for each smoky video clip, respectively;

passing the predicted de-smoked video clip for each smoky video clip, to the non-smoky frame critic model, to obtain a predicted de-smoking confidence score for each smoky video clip;

optimizing a total objective function of the encoder-decoder model, wherein the total objective function comprises:

(a) a de-smoking objective function which calculates an error between (i) the predicted de-smoked video clip corresponding to each smoky video clip and (ii) the smoke-free video clip corresponding to each smoky video clip;

(b) a segmentation objective function which calculates the error between (i) the predicted smoke segmentation map corresponding to each smoky video clip and (ii) the binary smoke segmentation mask for each smoky video frame of the predefined number of smoky video frames corresponding to each smoky video clip; and (c) a non-smoky critic objective function which calculates the error between (i) the predicted de-smoking confidence score for each smoky video clip, and (ii) a predefined de-smoking confidence score; and updating weights of the encoder unit and the decoder unit, based on the total objective function; and (b) training the non-smoky frame critic model, for each of the predefined consecutive training iterations, comprises:

forming the one or more smoky video clips out of the plurality of smoky video clips present in each smoky video of the plurality of smoky videos, as a second mini batch, based on the predefined mini batch size;

passing the one or more smoky video clips present in the second mini batch, to the encoder unit, to extract (i) the frame-level spatial features and (ii) the long-term spatio-temporal features, for each smoky video clip of the one or more smoky video clips;

passing (i) the frame-level spatial features and (ii) the long-term spatio-temporal features, for each smoky video clip of the one or more smoky video clips, to the de-smoking decoder unit and the smoke segmentation decoder unit, to obtain the predicted de-smoked video clip for each smoky video clip and the predicted smoke segmentation map for each smoky video clip, respectively;

passing the predicted de-smoked video clip for each smoky video clip, to the non-smoky frame critic model, to obtain the predicted de-smoking confidence score for each smoky video clip;

passing the smoke-free video clip corresponding to each smoky video clip, to the non-smoky frame critic model, to obtain a predicted smoke-free confidence score for each smoke-free video clip;

optimizing a critic objective function, wherein the critic objective function comprises: (i) a de-smoking score objective function which calculates the error between (a) the predicted de-smoking confidence score corresponding to the smoky video clip and (b) the predefined de-smoking confidence score, and (ii) a smoke-free score objective function which calculates the error between (a) the predicted smoke-free confidence score for each smoke-free video clip and (b) a predefined smoke-free confidence score; and updating weights of the non-smoky frame critic model based on the critic objective function;

receive an input smoky video for which smoke to be removed, wherein the input smoky video comprises one or more input smoky video clips, wherein each input smoky video clip of the one or more input smoky video clips comprises a predefined number of input smoky video frames;

pass each input smoky video clip, at a time, of the one or more input smoky video clips, to the trained de-smoking model, to obtain (i) the de-smoked video clip for each input smoky video clip of the one or more input smoky video clips, and (ii) a smoke segmentation map for each input smoky video clip of the one or more input smoky video clips, and stitch the de-smoked video clip for each input smoky video clip of the one or more input smoky video clips, to obtain the de-smoked video for the input smoky video.

* * * * *